United States Patent
Seo et al.

(10) Patent No.: US 7,964,808 B2
(45) Date of Patent: Jun. 21, 2011

(54) BUTTON APPARATUS AND MOBILE APPLIANCE HAVING THE SAME

(75) Inventors: Dong Min Seo, Pyeongtaek-si (KR); Dong Han Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 729 days.

(21) Appl. No.: 11/873,663

(22) Filed: Oct. 17, 2007

(65) Prior Publication Data

US 2008/0093208 A1 Apr. 24, 2008

(30) Foreign Application Priority Data

Oct. 23, 2006 (KR) .................. 10-2006-0102955
Dec. 19, 2006 (KR) .................. 10-2006-0130206
Dec. 19, 2006 (KR) .................. 10-2006-0130213

(51) Int. Cl.
*H01H 9/00* (2006.01)
(52) U.S. Cl. .......... 200/5 R; 200/5 A; 200/296; 200/333
(58) Field of Classification Search ............. 200/5 R, 200/5 A, 511, 512, 517, 329, 333, 302.1–302.3, 200/298, 61.54, 61.57; 341/20, 22, 34; 345/156, 345/157, 160, 161, 168, 169; 348/211.99, 348/211.4
See application file for complete search history.

(56) References Cited

U.S. PATENT DOCUMENTS

| | | | | |
|---|---|---|---|---|
| 4,092,527 | A * | 5/1978 | Luecke | 708/140 |
| 5,140,632 | A * | 8/1992 | Anten | 379/447 |
| 5,657,052 | A * | 8/1997 | Lerude | 345/168 |
| 5,689,095 | A * | 11/1997 | Kawase | 200/5 R |
| 6,172,620 | B1 * | 1/2001 | Brick et al. | 341/22 |
| 6,500,169 | B1 * | 12/2002 | Deng | 606/1 |
| 6,788,285 | B2 * | 9/2004 | Paolucci et al. | 345/156 |
| 6,987,231 | B2 * | 1/2006 | Schmon et al. | 200/61.54 |
| 7,041,924 | B2 * | 5/2006 | Jeschke et al. | 200/302.2 |
| 7,173,201 | B2 * | 2/2007 | Fukaya et al. | 200/6 A |
| 7,173,606 | B2 * | 2/2007 | Honkala et al. | 345/169 |
| 7,579,561 | B2 * | 8/2009 | Wee et al. | 200/5 A |
| 7,751,788 | B2 * | 7/2010 | Otani et al. | 455/186.2 |

* cited by examiner

*Primary Examiner* — Michael A Friedhofer
(74) *Attorney, Agent, or Firm* — KED & Associates, LLP

(57) ABSTRACT

A button apparatus and a mobile appliance having the same are provided. A button cover plate having button areas forms an external portion of a case of the appliance. The button areas may be flat on the surface of the button cover plate 36, and include compression bosses on a rear side thereof that contact and manipulate corresponding switches mounted on a substrate. The button cover plate may be seated in a button recess formed on the case 10. When so arranged, the button apparatus does not project from an outer surface of the mobile appliance, and an external design of the mobile appliance may be varied.

20 Claims, 19 Drawing Sheets

BUTTON APPARATUS AND MOBILE APPLIANCE HAVING THE SAME

This application claims the benefit of Korean Patent Application Nos. 10-2006-0102955 filed on Oct. 23, 2006; 10-2006-0130213 filed Dec. 19, 2006; and 10-2006-0130206 filed Dec. 19, 2006, the entirety of which is incorporated herein by reference.

BACKGROUND

1. Field

This relates to a button apparatus, and more particularly to a button apparatus and a mobile appliance having such a button apparatus

2. Background

A portable terminal used as a mobile appliance may include a mobile phone, a PDA, a smart phone, a PMC (Portable Multimedia Center), a PMP (Portable Multimedia Player), or the like, wherein the main function of the mobile phone is a phone function, the main function of the PDA is an electronic note function, the smart phone has both a phone function and an electronic note function, and the PMC or PMP is capable of reproducing a moving image. The various functions of these portable terminals may be controlled by function buttons or switches that are accessible to a user from an external portion of the terminal.

BRIEF DESCRIPTION OF THE DRAWINGS

The embodiments will be described in detail with reference to the following drawings in which like reference numerals refer to like elements wherein.

DETAILED DESCRIPTION

Figure 1:
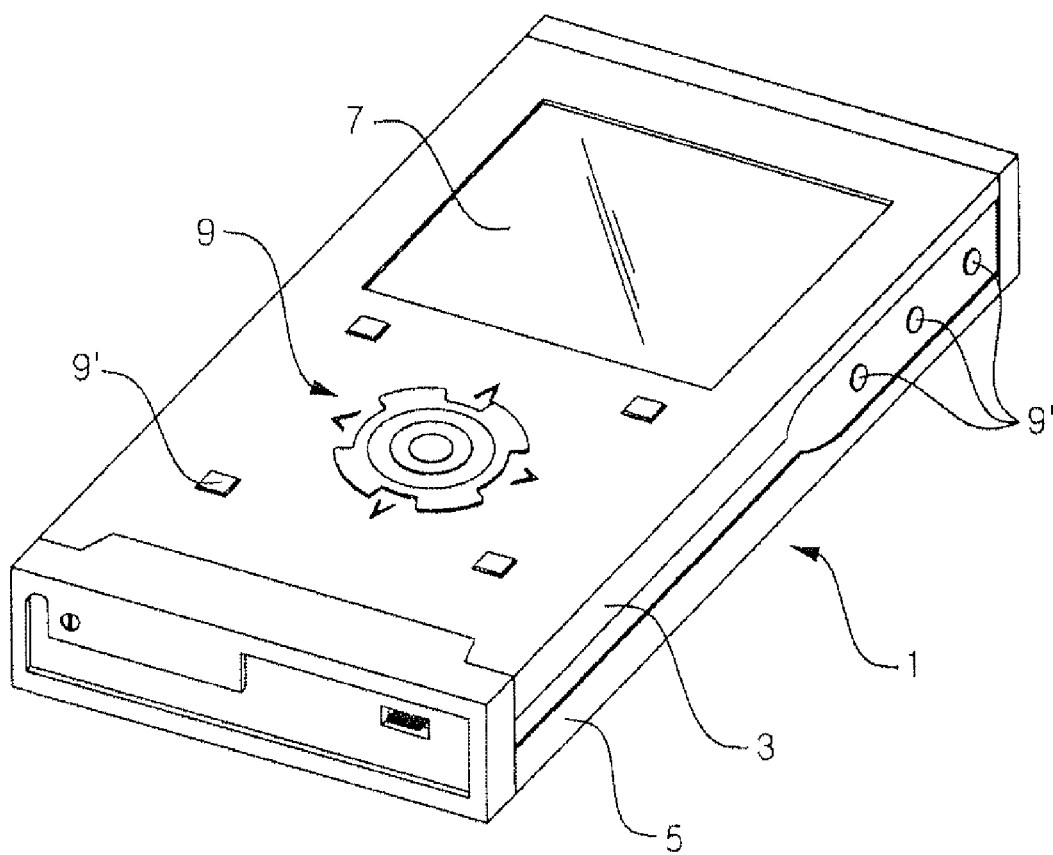
FIG. 1 is a perspective view of an exemplary mobile appliance.
Figure 2:
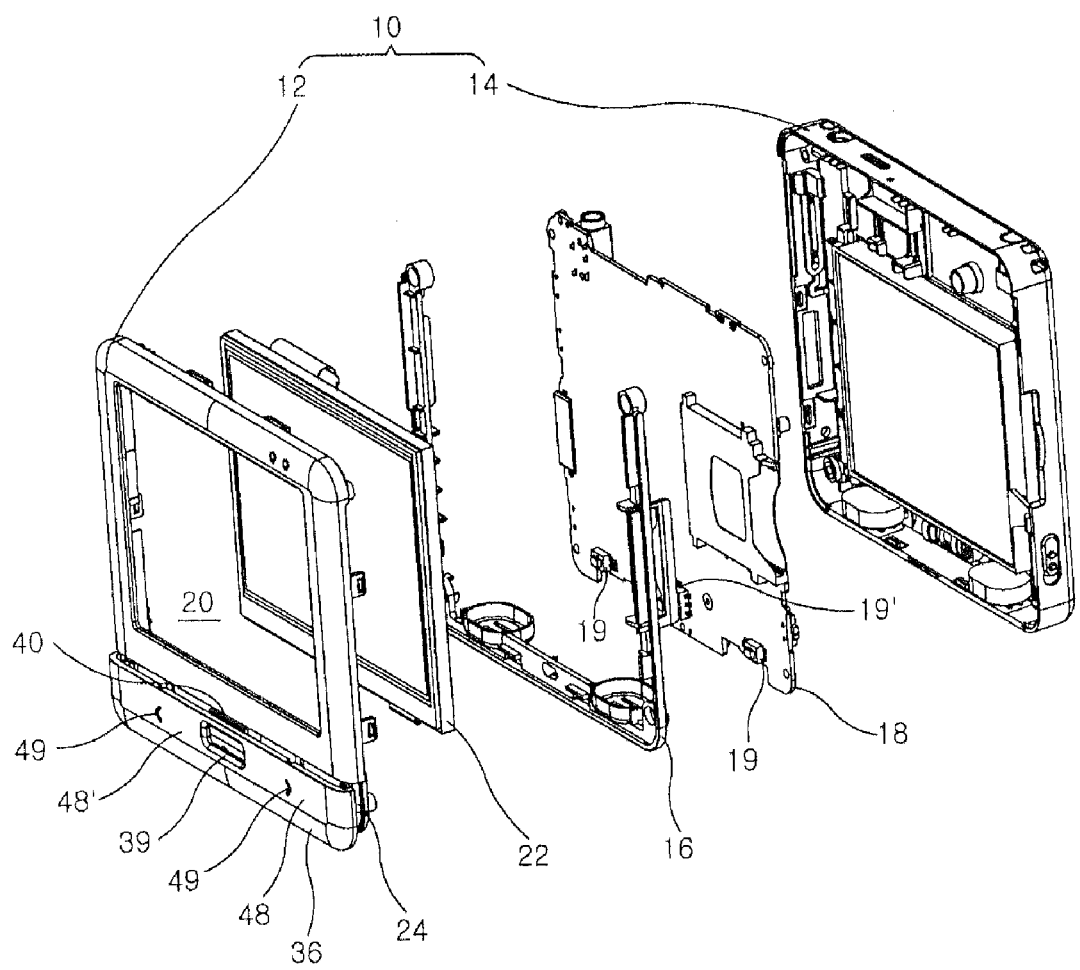
FIG. 2 is an exploded perspective view of a mobile appliance according to an embodiment as broadly described herein.
Figure 3:
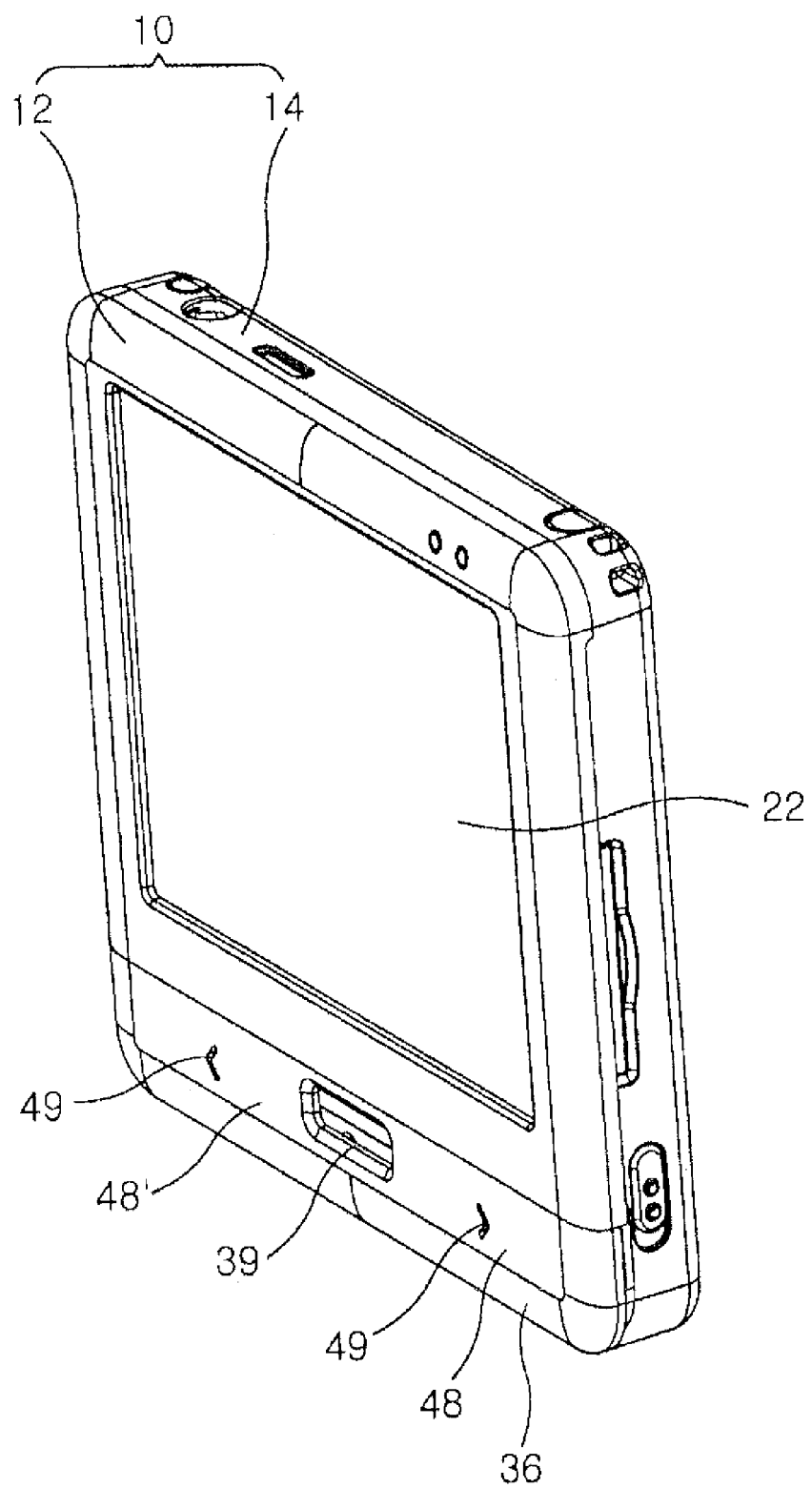
FIG. 3 is a perspective view of the mobile appliance shown in FIG. 2.
Figure 4:
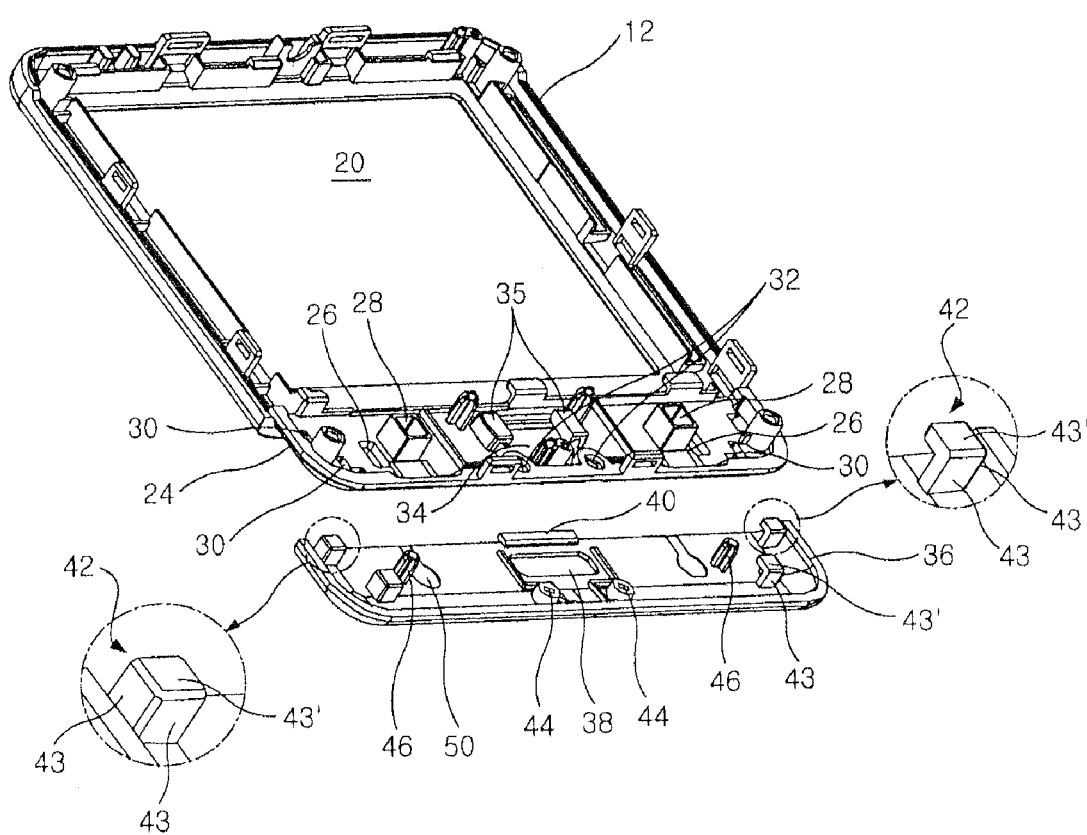
FIG. 4 is a rear side perspective view of an interior of the mobile appliance shown in FIG. 2.
Figure 5:
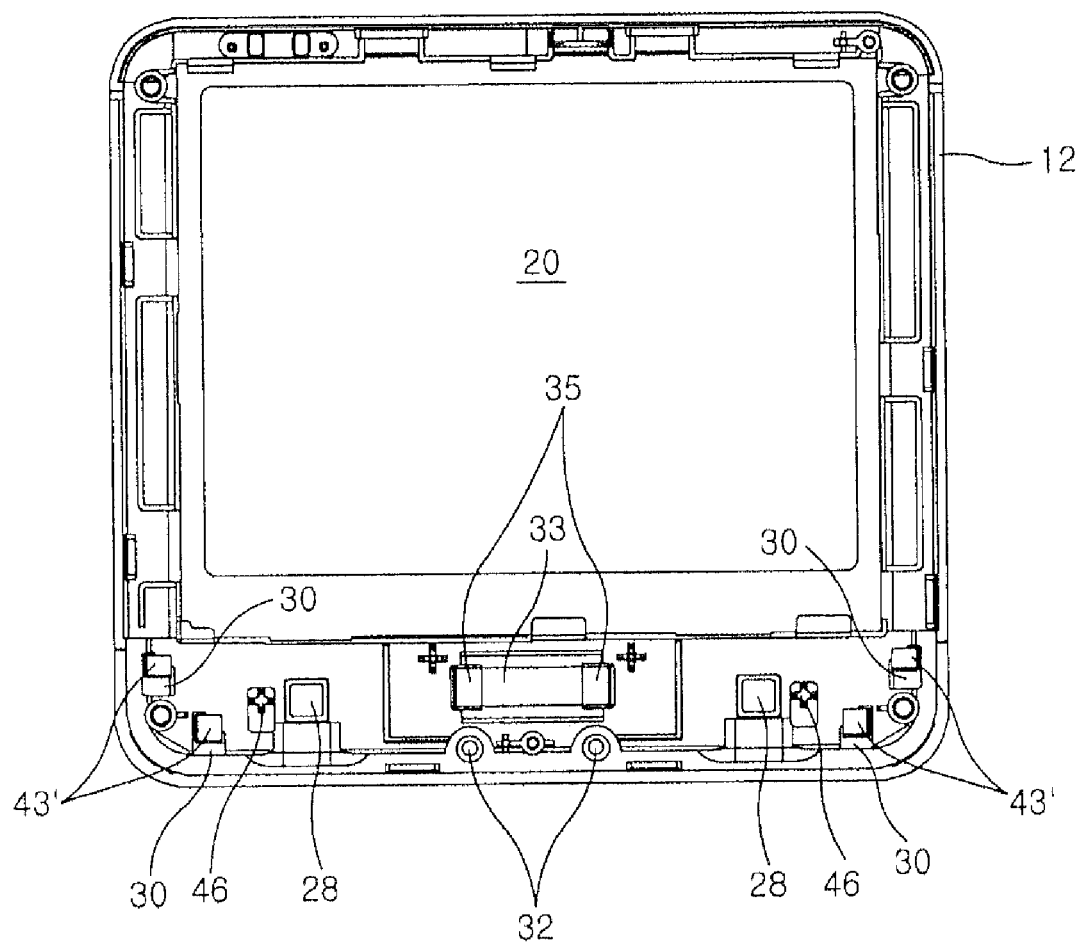
FIG. 5 is a rear view of the front case of the mobile appliance shown in FIG. 2.
Figure 6A:
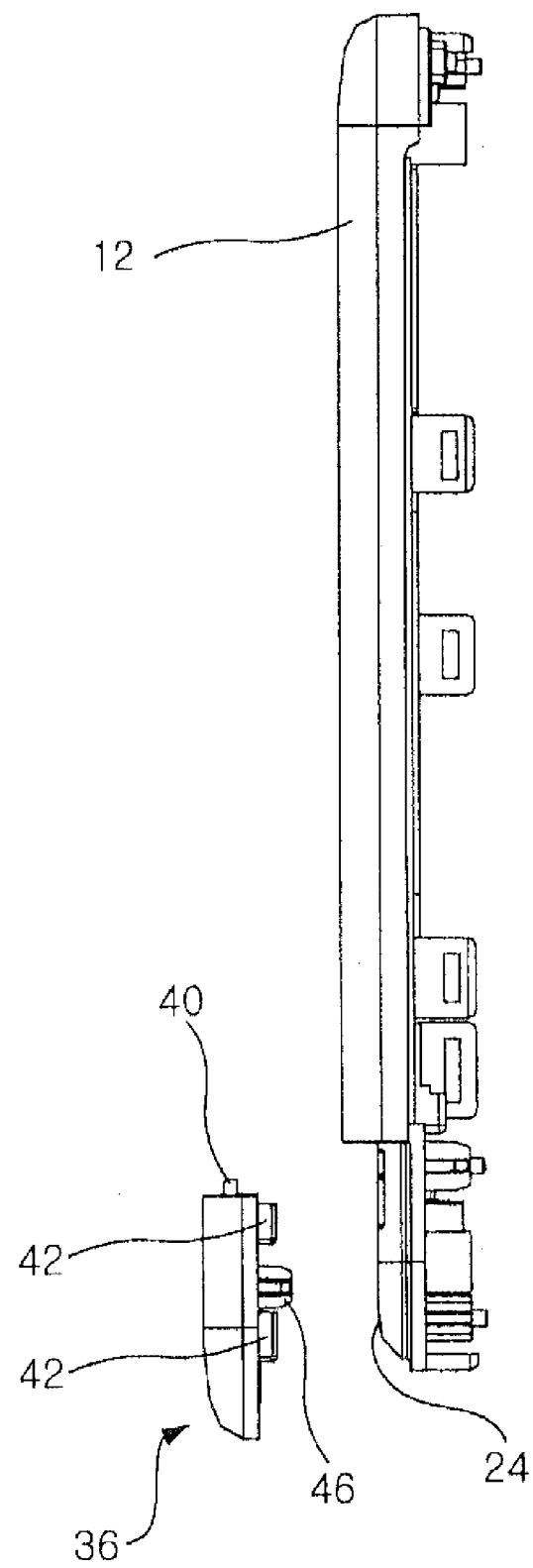
FIGS. 6a to 6c are side views sequentially illustrating a process of mounting a cover button plate to a button recess.
Figure 6B:
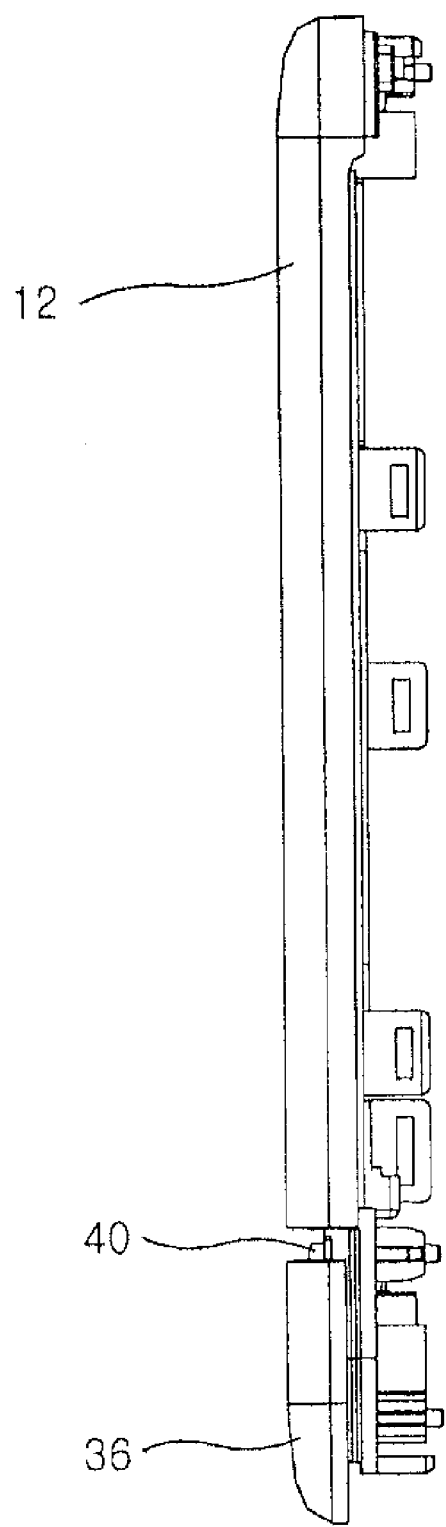
Figure 6C:
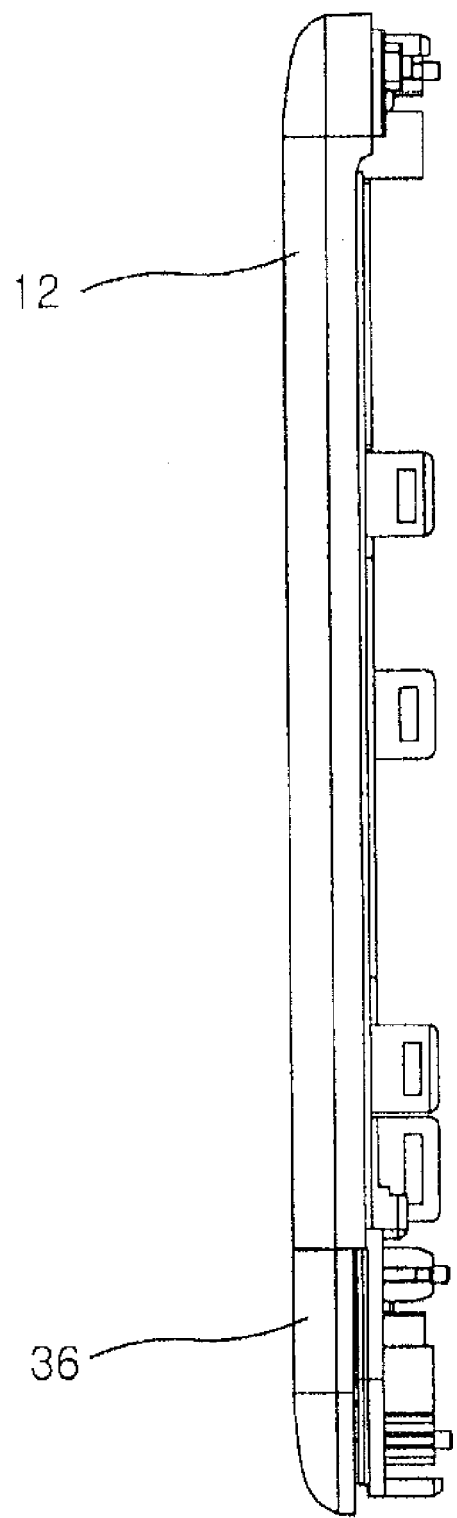

Hereinafter, embodiments will be described in more detail with reference to accompanying drawings. In the following description and drawings, the same reference numerals are used to designate the same or similar components.

FIG. 1 is a perspective view of an exemplary mobile appliance. As shown in the drawing, a case 1 forms the external appearance of the mobile appliance. The case 1 includes a front plate 3 and a rear plate 5. The front plate 3 forms the front face and a part of opposite side faces of the case 1, and the rear plate 5 forms the rear face and a part of the opposite side faces of the case 1.

A display unit 7 is provided, which occupies much of the upper half of the front plate 3. A liquid crystal display panel or the like is employed as the display unit 7 for displaying a desired image. The lower half of the front plate 3 is provided with a jog button 9 and a plurality of function buttons 9'. By pressing the jog button 9 and the function buttons 9', given functions can be executed. The function buttons 9' are also provided on one or both side faces of the case 1.

However, in the exemplary mobile appliance shown in FIG. 1, the jog button 9 and the function buttons 9' are always exposed. In particular, because the jog button 9 and the function buttons 9' project from the front face 3, they may be inadvertently pressed. In addition, because the jog button 9 and the function buttons project from the front plate 3, there is also a problem in that it is impossible to vary a design of the external appearance of such a mobile appliance. As a result, it is difficult to satisfy consumers' demands. A touch type button apparatus may instead be employed, the buttons of which are manipulated by using static electricity produced when the buttons are touched by a hand.

As shown in FIGS. 2 to 5, a case 10 forms an external appearance of a mobile appliance. The case 10 includes a front case 12 and a rear case 14. The front case 12 forms the entire front face, a part of the opposite side faces, and a part of the top and bottom faces of the case 10, and the rear case 14 forms the entire rear face, a part of the opposite side faces, and a part of the top and bottom faces of the case 10. However, the case 10 is not necessarily formed only by the front case 12 and the rear case 14.

As the front case 12 and the rear case 14 are assembled with each other, a space is formed between them. Within the space, a frame 16 is provided, to which the front case 12 and the rear case 14 are assembled, respectively. In this embodiment, the frame 16 provided within the space formed by the front case 12 and the rear case 14 may form a part of the case 10, i.e., a part of the external appearance.

A substrate 18 is also provided within the space formed by the front case 12 and the rear case 14. The substrate 18 is mounted with various components for the mobile appliance. One or more tact switches 19 and a multi-function switch 19' forming a button apparatus are mounted on the substrate 18. For reference, a dome switch may be employed instead of the tact switches 19.

A window 20 is formed in such a manner that the window occupies much of the area of the front face of the front case 12. Through the window, a display unit 22 is exposed. The display unit 22 displays an image on the mobile unit, wherein a liquid crystal display panel is typically employed as the display unit 22. The display unit 22 is mounted on the rear side of the front case 12, so that its front face is exposed to the outside through the window 20.

A button recess 24 is formed below the window 20 on the front case 12. The button recess 24 is relatively recessed as compared to the other part of the front face of the front case 12. A cover button plate 36 to be described below is seated in the button recess 24. At least one bossed through-hole 26 is formed in the button recess 24. The bossed through-hole 26 is formed through the button recess 24. As a result, the bossed through-hole 26 is opened to the rear side of the front case 12. In this embodiment, two bossed through-holes 26 are formed in the button recess 24 substantially in a rectangular shape.

Light passages 28 are formed adjacent to the bossed through-holes 26, respectively. The light passages 28 serve to transmit light emitting from a light source (not shown) mounted on the substrate 18 to the front face of the cover button plate 36. In this embodiment, each of the light passages is formed in a rectangular tube shape.

Each of the opposite ends of the button recess 24 is formed with two hook holes 30. The hook holes 30 are formed in a "⌐" or "⌐" shape when viewed from the rear side of the button recess 24 (see FIG. 5). Among the hook holes 30, the hook holes 30 parallel to the lower edge of the button recess 24 are relatively widely formed. This is to allow slide hooks 42, which are hooked in the hook holes 30, respectively, to be slid by a predetermined distance in a state in which the slide hooks 42 are inserted in the hook holes 30. In particular, one end of each hook hole 30 has an area for allowing a hook wall 43' of a corresponding slide hook 42 to pass the hook hole 30. The hook wall 43' will be described later. For reference, each hook hole 30 is formed by two slits crossed at right angles. Therefore, such a hook hole may be referred to as a right-angled hole.

At the central lower end part of the button recess 24, two fitting holes 32 are formed in parallel to each other. Screws for assembling the cover button plate 36 to the front case 12 are fitted in the fitting holes 32, respectively.

A button hole 34 is formed at the central area of the cover button plate 32, and a multi-function button 33 is positioned within the button hole 34. The multi-function button 33 is a kind of a jog button, which allows a desired function to be selected by being moved up and down, left and right, or being pressed. The multi-function button 33 is connected with the multi-function switch 19', thereby allowing the multi-function switch 19' to be manipulated.

Button racks 35 are formed on the rear side of the front case 12 at the positions corresponding to the opposite ends of the multi-function button hole 34. The button racks 35 engage with the multi-function button 33, thereby allowing the multi-function button 33 to be installed in the multi-function button hole 34.

The cover button plate 36 is seated in the button recess 24. If the cover button plate 36 is seated in the button recess 24, the surface of the front case 12 and the surface of the cover button plate 36 form a continuous smooth surface. In other words, there is no difference in height between the two surfaces.

The cover button plate 36 forms the external appearance of the front face and opposite side faces of the lower end area of the front case 12, and the bottom face of the front case 12. The cover button plate 36 is formed with a button opening 38 at a position corresponding to the multi-function button hole 34. The multi-function button 33 is exposed to the front side of the cover button plate 36 through the button opening 38.

The cover button plate 36 is formed with a first hook ridge 40 at the central area of the upper end thereof. The first hook ridge 40 is inserted in a hook recess (not shown) formed at the upper end of the button recess 24, so that the upper end of the cover button plate 36 is rigidly engaged with the front case 12. The hook is formed at a right-angled transition area between the front face and the button recess 24 of the front case 12 when viewed from the front of the button recess 24.

As described above, the slide hooks 42 are formed at the opposite ends of the rear side of the cover button plate 36. The slide hooks 42 are engaged in the hook holes 30. Each of the slide hooks 42 is formed on the rear side of the cover button plate 36 in a shape having two vertical rectangular walls 43 vertically extending from the rear side of the cover button plate 36 and one horizontal rectangular wall 43' formed on the top ends of the two vertical walls, wherein all the three walls are integrally formed and crossed at right angles with each other. Here, the vertical walls are referred to as insertion walls 43 and, and the horizontal wall is referred to as the hook wall 43'. The insertion walls 43 of each slide hook 42 extend through a corresponding hook hole 30. The hook wall 43' comes into tight contact with the rear side of the button recess 24, thereby being engaged with the rear side of the button recess 24. The slide hooks 42 formed at the opposite ends of the cover button plate 36 are symmetrically arranged.

The cover button plate 36 is formed with fitting grooves 44 on the rear side thereof at the positions corresponding to the fitting holes 32 in the front case 12. Screws passing through the fitting holes 32 are engaged in the fitting grooves 44.

The cover button plate 36 is formed with compression bosses 46 on the rear side thereof. The compression bosses 46 positionally correspond to the tact switches 19 on the substrate 18. In this embodiment, two compression bosses 46 are formed.

The cover button plate 36 is formed with first and second button areas 48 and 48' on the front face thereof at the positions corresponding to the compression bosses 46. The first and second button areas 48 and 48' are formed in a thickness to be somewhat elastically deformable when a user presses the areas. If any of the first and second button areas 48 and 48' is pressed and elastically deformed, a corresponding compression boss 46 is backwardly pushed, thereby pressing a corresponding tact switch 19.

Each of the first and second button areas 48 and 48' is provided with a button indication 49. The button indication 49 is a symbol indicating a function to be executed when a corresponding button area 48 or 48' is pressed. The button indications 49 are illuminated by light transmitted through the light passages 28, so that they can be recognized from the outside.

For this purpose, the areas having the button indications 49 are provided with optical members formed from a material through insert-injection molding or dual-injection molding. The optical members have a characteristic of transmitting light emitted from a light source to the outside.

Now, the button apparatus in accordance with this embodiment and a mobile appliance having the same will be described in more detail in terms of the functional actions thereof.

At first, a description will be made as to how to mount the button appliance to the case 10 of the mobile appliance. The cover button plate 36 is positioned adjacent to the button recess 24 formed on the front case 12. At this time, the cover button plate 36 is positioned somewhat below the lower edge of the button recess 24, and each of the slide hooks 42 is inserted through a slit of a corresponding hook hole 30 and projects from the rear side of the front case 12.

From this state, the cover button plate 36 is lifted along the button recess 24. That is, the cover button plate 36 is moved so that the first hook ridge 40 is engaged in the hook groove on the front case 12. If the cover plate 36 is moved and the first hook ridge 40 is engaged in the hook groove, the fitting holes 32 and 44 are correspondingly positioned.

In addition, the multi-function button 33 is exposed to the outside through the button opening 38, so that a user can manipulate the multi-function button 33. In addition, the slide hooks 42 are moved within the hook holes 30, so that the hook walls 43' are engaged with the rear side of the front case 12.

As the hook walls 43' are engaged with the rear side of the front case 12 and the first hook ridge 40 is engaged in the hook groove, the cover button plate 36 cannot be inadvertently released from the button recess 24. However, the cover button plate 36 is positioned in a state in which it is slidable toward the lower end of the front case 12.

Therefore, in order to finally assemble the cover button plate 36 to the front case 12, screws are fitted in the fitting holes 32 and 44 from the rear side of the front case 12. As such, the cover button plate 36 is completely affixed to the front case 12.

Meanwhile, if the surface of the cover button plate 36 forms a continuous surface with the surface of the front case 12, and if the cover button plate 36 is formed from the same material and same color as the front case 12 from a user's view, the cover button plate 36 and the front case 12 may not be considered as different components.

If the assembly of a mobile appliance is completed by mounting the button apparatus to the mobile appliance and installing the substrate 18 within the case 10, the compression bosses 46 are positioned adjacent to or in contact with the tact switches 19 on the substrate 18. As such, if any of the first and second button areas 48 and 48' is pressed by a user, a corresponding compression boss 46 presses a corresponding tact switch 19.

In addition, the multi-function button 33 is positioned to be capable of cooperating with the multi-function switch 19', so that if the user manipulates the multi-function button 33, the multi-function switch 19' is operated, thereby rendering a desired operation to be executed.

The light passages 28 can receive light emitted from the light source mounted on the substrate 18 and transmit the light to the button indications 49. If the light emitted from the light source is transmitted to the button indications 49 through the light passages 28, the button indications 49 are illuminated, so that the user can easily confirm the button indications 49.

Next, another embodiment of the present invention will be described with reference to FIGS. 7 to 10. Referring to the drawings, a case 110 forms the external appearance of a mobile appliance. The case 110 may include a front case 112 and a rear case 114. The front case 112 forms substantially the entire front face of the case 110, and partially forms the opposite side faces and the top and bottom faces of the case 110. The rear case 114 forms substantially the entire rear face of the case 110, and partially forms the opposite side faces and the top and bottom faces of the case 110. However, the case 110 is not necessarily formed by the front case 112 and the rear case 114. A space is formed between the front case 112 and the rear case 114, and various components of the mobile appliance are installed within the space.

A connector 115 is installed through a right or left part of the bottom edge of the rear case 114, and hence a part of the bottom of the case 110. The connector 115 may be installed to be capable of being retracted into/extended from the case 110. The connector 115 may be used for data transmission with an external apparatus, for example, a computer. A USB connector may be employed as the connector 115.

The front case 112 is formed with a display window 116 on a left or right area of the front face thereof. The display window 116 is a portion for exposing a liquid crystal display panel 130 for displaying an operating condition or the like. The liquid crystal display panel 130 will be described later. In this embodiment, the display window 116 is formed to extend in the vertical direction on the front case 112.

The front case 112 is formed with a button recess 118. The button recess 118 is relatively recessed as compared to the other part of the front face of the front case 112. A cover button plate 140 to be described later is seated on the button recess 118. The button recess 118 is formed on the lower area of the front face of the front case 112.

The button recess 118 is substantially rectangular when viewed from the top of the front case 112. A pair of hook slots 120 are formed in the button recess 118. Locking hooks 144 of the cover button plate 140 to be described later extend through the hook slots 120, respectively. The hook slots 120 are formed at the positions spaced from the center of the button recess 118.

The button recess 118 is also formed with a plurality of guide boss holes 122. Guide bosses 146 of the cover button plate 140 extend through the guide boss holes 122, respectively. In this embodiment, four guide boss holes 122 are formed. The guide boss holes 122 are formed in a shape corresponding to the external shape of the guide bosses 146 to be described later.

The button recess 118 is also formed with a plurality of switch holes 124. The switch holes 124 are formed in a rectangular shape in this embodiment. The switch holes 124 are formed at the positions corresponding to dome switches 136 on a button substrate 134 to be described later. In this embodiment, four switch holes 124 are arranged at the four sides, respectively, about the center of the button recess 118.

The button recess 118 is also formed with a central switch hole 126 including the geometric center of the button recess 118. The central switch hole 126 is also formed at the area corresponding to a dome switch 136 of the button substrate 134. For reference, the hook slots 120 and the guide boss holes 122 are formed between the central switch hole 126 and the switch holes 124 formed the opposite ends of the bottom recess 118.

A main substrate 128 is installed within the case 110. The main substrate 128 has an insulation layer, on which a circuit pattern is formed, and various devices are mounted on the main substrate 128. The main substrate 128 has an area substantially corresponding to the plan area of the rear case 114 when the rear case 114 is viewed from the top of the rear case 114. For reference, the rear case 114 has an area smaller than the plan area of the rear case 114 by an area for installing a battery. A chipset, a memory, or the like may be taken as an example of such a device mounted on the main substrate 128.

A liquid crystal display panel 130 is installed within the case 110. The liquid crystal display panel 130 is located at a position corresponding to the display window 116. The display window 116 corresponding to the front face of the liquid crystal display panel 130 is equipped with a window lens 132. The window lens 132 serves to protect the liquid crystal display panel 130. The window lens 132 may be installed on the front face of the liquid crystal display panel 130 and positioned in the display window 116.

The button substrate 134 is seated on the top of the main substrate 128 at a predetermined area. The button substrate 134 is mounted on the main substrate 128 through a separate structure, for example, a spacer (not shown). The button substrate 134 and the main substrate 128 may be interconnected by a separate flexible cable (not shown).

On the button substrate 134, a plurality of dome switches 136 are installed. The dome switches 136 are formed in a dome shape and operated by being pressed by external force. Tact switches may be employed instead of the dome switches. Of course, if the tact switches are employed, the thickness of the case 110 may be generally increased because the top of the tact switches is relatively highly positioned on the button substrate 134.

The dome switches 136 are arranged in such a manner that one of them is centrally positioned, and the others are positioned at the four sides, respectively, about the centrally positioned one. Therefore, a total of five dome switches 136 are used. For example, the centrally positioned dome switch 136 is provided for selection and execution of functions, the left and right dome switches 136 are provided for adjusting volume, and the top and bottom dome switches 136 are provided for moving a cursor.

The cover button plate 140 is mounted on the button recess 118 on the front case 112. The cover button plate 140 is formed by injection-molding a synthetic resin substantially in a shape of a rectangular plate. The cover button plate 140 is provided with a button 142 at the central area thereof. The button 142 may be separately fabricated and mounted on the cover button plate 140 or integrally formed with the cover button plate to be elastically deformable. The button 142 is adapted to operate the dome switch 136 centrally mounted on the button substrate 134 through the switch hole 126.

Button indications 143 are formed on the front faces of the cover button plate 140 and the button 142. The button indications 143 are formed by symbols indicating functions to be executed when corresponding areas are pressed. The button indications 143 are provided at the positions corresponding to the dome switches 136, respectively.

Figure 9:
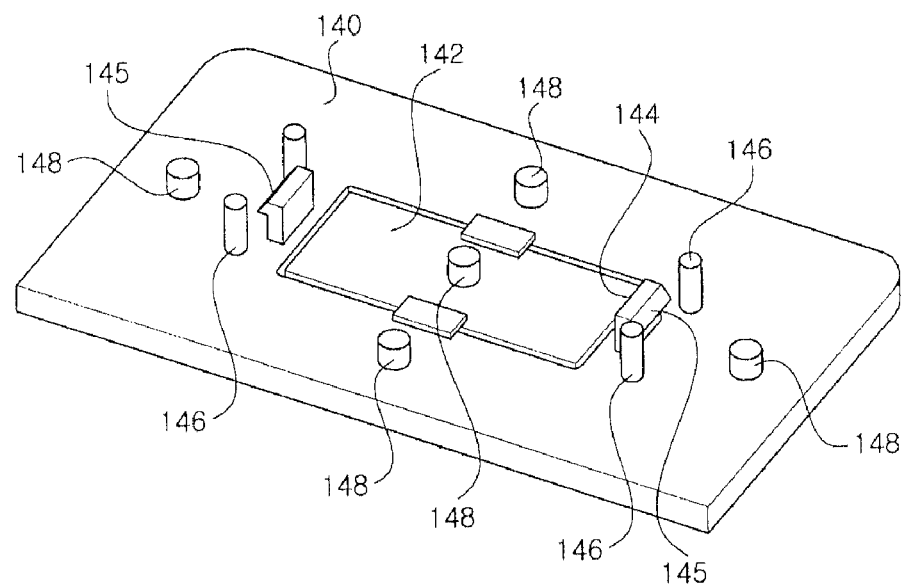
FIG. 9 is a rear view of a cover button plate of the mobile appliance shown in FIG. 7.
Figure 10:
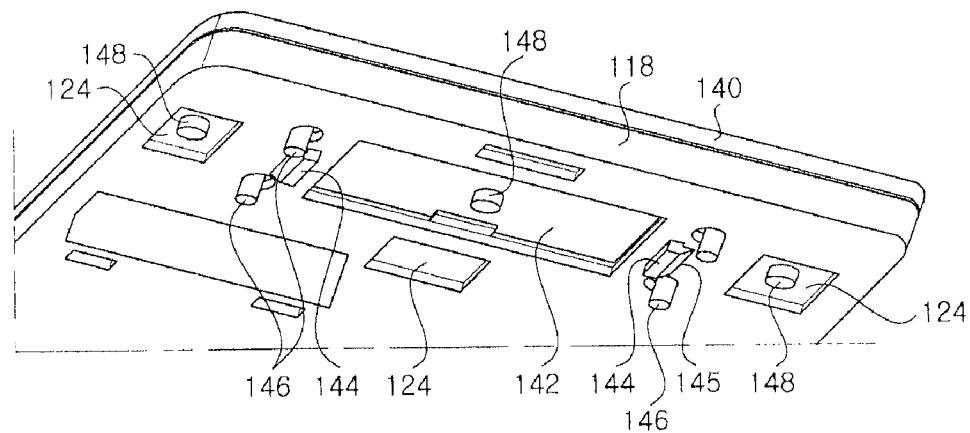
FIG. 10 is a bottom view of a cover plate assembled to the front case of the mobile appliance shown in FIG. 7.

The construction of the rear side of the cover button plate 140 is clearly shown in FIG. 9. Referring to FIG. 9, locking hooks 144 are formed on the rear side of the cover button plate 140. The locking hooks 144 extend through the hook slots 120 in the button recess 118 and are engaged with the rear side of the front case 112. At the tip end of each locking hook 144 is provided with a hook ridge 145 engaged with the rear side of the front case 112. The length of the locking hooks 144 is determined in such a manner that when the cover button plate 140 is seated on the button recess 118, the cover button plate 140 is not moved. That is, the rear side of the cover button plate 140 is substantially in tight contact with the button recess 118.

The rear side of the cover button plate 140 is formed with guide bosses 146. The guide bosses 146 extend through the guide boss holes 122 formed in the button recess 118, respectively, and the tip ends thereof are supported by the button substrate 134. The guide bosses 146 serve to prevent the cover button plate 140 from being elastically deformed at the positions corresponding to any of the dome switches 136 when the cover button plate 140 is pressed at a certain position, i.e., the position of any of the dome switches 136. For this purpose, the guide bosses 146 are formed avoiding the areas where the dome switches 136 are provided. For example, they are formed on the rear side of the cover button plate 140 at the positions corresponding to the areas between the switch holes 126 of the front case 112.

The rear side of the cover button plate 140 is formed with compression bosses 148. The compression bosses 148 are formed to be relatively short as compared to the guide bosses 146. The difference in length between the compression bosses 148 and the guide bosses 146 corresponds to the height of the dome switches 436. That is, in this embodiment, compression bosses 146 are formed on the rear side of the cover button plate 140 at the position corresponding to the center of the button 142 and the positions adjacent to the four corners of the button 142.

The functional action of the embodiment configured as described above will now be described in detail.

Figure 7:
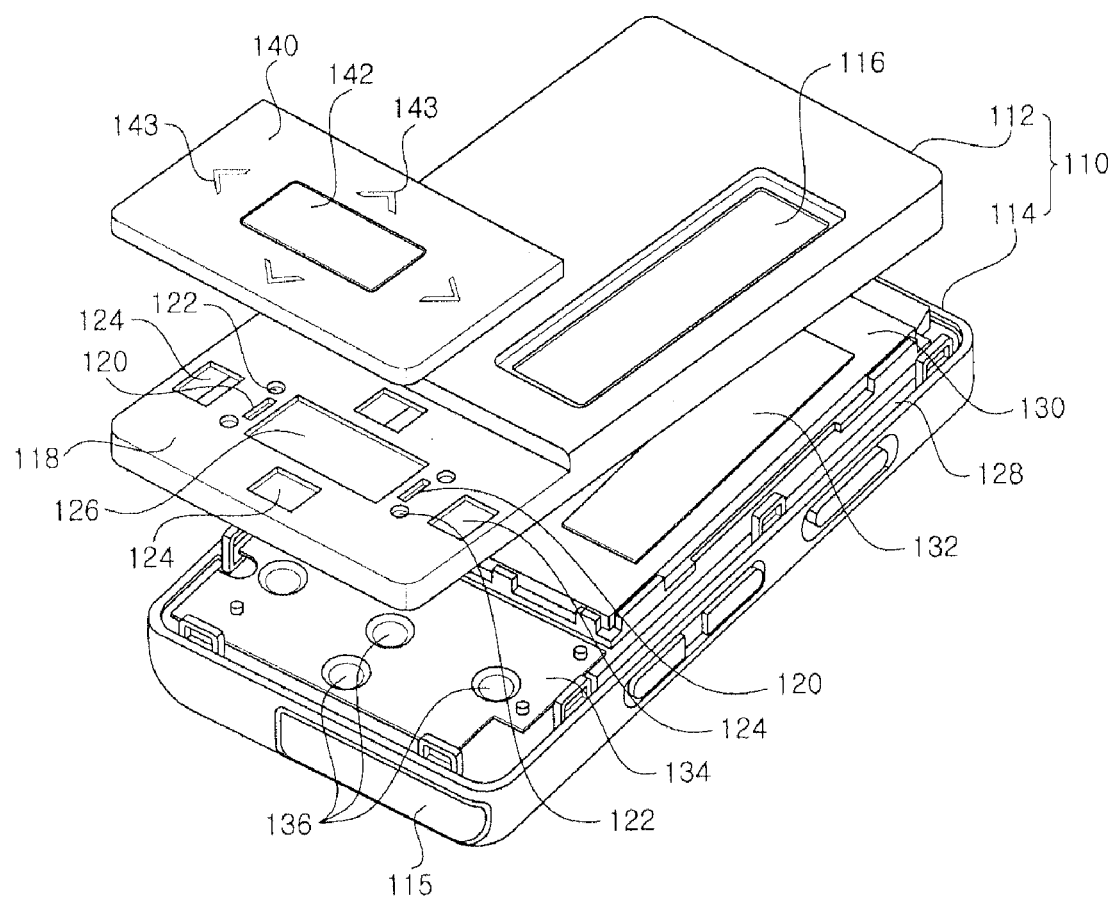
FIG. 7 is an exploded perspective view of a mobile appliance according to another embodiment as broadly described herein.
Figure 8:
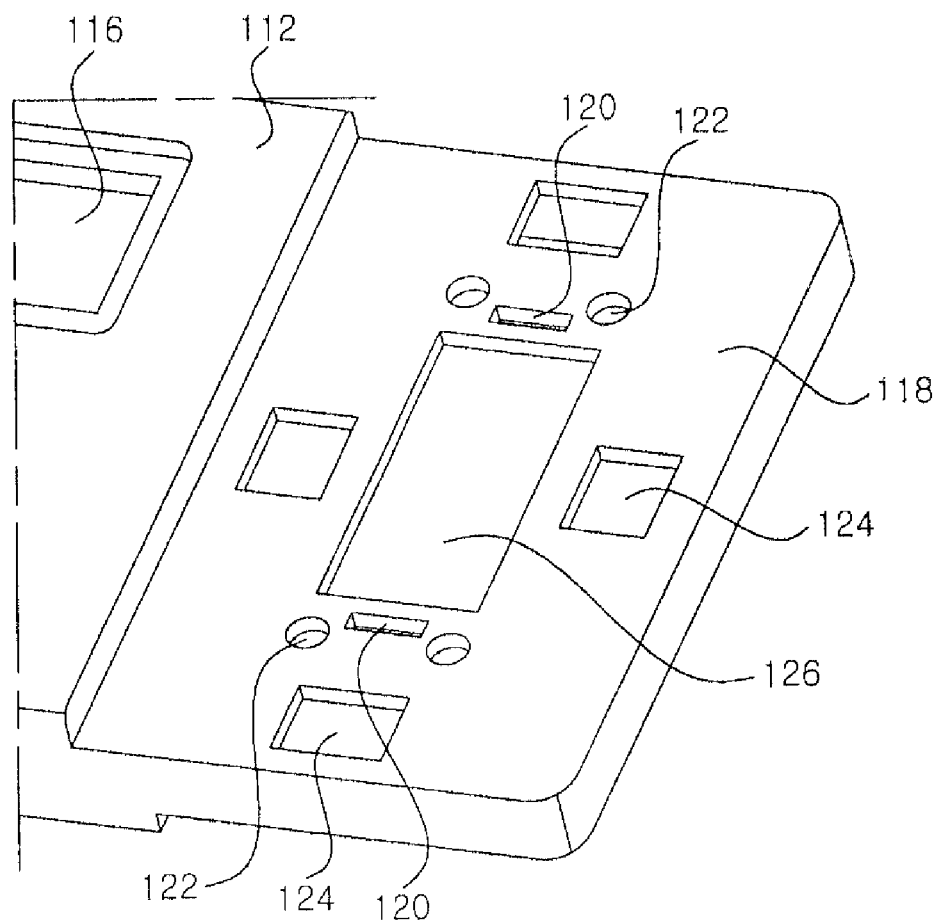
FIG. 8 is a detailed perspective view of a main part of a front case of the mobile appliance shown in FIG. 7.

At first, a description will be made as to how to assemble the mobile appliance of this embodiment. As shown in FIG. 7, the main substrate 128, the liquid crystal display panel 130, and the button substrate 134 are seated on the rear case 114. In addition, the cover button plate 140 is mounted on the front case 112.

The cover button plate 140 is mounted on the button recess 118 of the front case 112 as the locking hooks 144 extend through the hook slots 120 and the locking ridges 145 are engaged with the rear side of the front case 112. When the cover button plate 140 is mounted on the button recess 118 in this manner, the surface of the cover button plate 140 and the front face of the front case 112 are flush with each other.

At the same time when the locking hooks 144 are inserted into the hook slots 120 and locked, the guide bosses 146 extend through the guide boss holes 122 and project from the rear side of the front case 112. The compression bosses 148 extend through the switch holes 124 and 126 toward the rear side of the front case 112.

Next, the rear case 114 and the front case 112 are engaged with each other. When the rear case 114 and the front case 112 are engaged with each other, the guide bosses 146 on the rear side of the cover button plate 140 are supported on the surface of the button substrate 134. As the guide bosses 146 are supported by the button substrate 134, even if one of the button indications 143 is pressed, the cover button plate 140 will not be elastically deformed at the areas corresponding to the other button indications 143.

Meanwhile, the compression bosses 148 are positioned in such a manner that they are in contact with the dome switches 136 or the tip ends of thereof are positioned above the dome switches 136. In this condition, if one of the button indications 143 is pressed and elastically deformed, the corresponding compression boss 148 presses and operates the corresponding dome switch 136.

Figure 11:
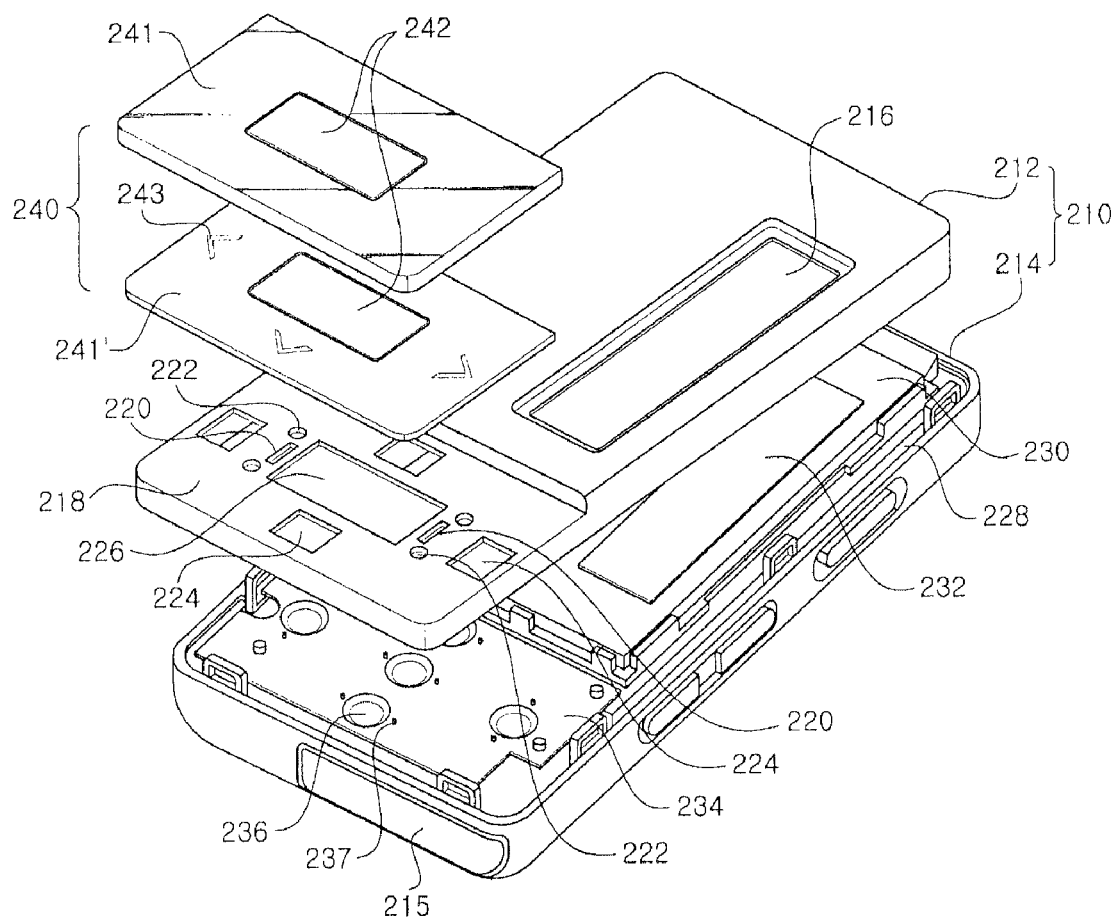
FIG. 11 is an exploded perspective view of another embodiment as broadly described herein.

Next, another embodiment of the present invention will be described with reference to FIGS. 11 and 12. Referring to the drawings, a case 210 forms the external appearance of a mobile appliance. The case 210 may include a front case 212 and a rear case 214. The front case 212 forms substantially the entire front face of the case 210 and partially forms the opposite side faces and the top and bottom faces of the case 210. The rear case 214 forms substantially the entire rear face of the case 210 and partially forms the opposite side faces and the top and bottom faces of the case 210. However, the case 210 is not necessarily formed only by the front case 212 and the rear case 214. A space is formed by the front case 212 and the rear case 214, and various components of the mobile appliance are installed within the space.

A connector 215 is installed through a right or left part of the bottom edge of the rear case 214, and hence a part of the bottom of the case 210. The connector 215 may be installed to be capable of being retracted into/extended from the case 210. The connector 215 may be used for data transmission with an external apparatus, for example, a computer. A USB connector may be employed as the connector 215.

The front case 212 is formed with a display window 216 on a left or right area of the front face thereof. The display window 216 is a portion for exposing a liquid crystal display panel 230 for displaying an operating condition or the like. The liquid crystal display panel 130 will be described later. In this embodiment, the display window 216 is formed to extend in the vertical direction on the front case 112.

The front case 212 is formed with a button recess 218. The button recess 218 is relatively recessed as compared to the other part of the front face of the front case 212. A cover button plate 240 to be described later is seated on the button recess 218. The button recess 218 is formed on the lower area of the front face of the front case 212.

The button recess 218 is substantially rectangular when viewed from the top of the front case 212. A pair of hook slots 220 are formed in the button recess 218. Locking hooks 244 of the cover button plate to be described later extend through the hook slots 220, respectively. The hook slots 220 are formed at the positions spaced from the center of the button recess 218.

The button recess 218 is also formed with a plurality of guide boss holes 222. Guide bosses 246 of the guide button plate 240 extend through the guide boss holes 222, respectively. In this embodiment, four guide boss holes 222 are formed. The guide boss holes 222 are formed in a shape corresponding to the external shape of the guide bosses 246 to be described later.

The button recess 218 is also formed with a plurality of switch holes 224. The switch holes 224 are formed in a rectangular shape in this embodiment. The switch holes 224 are formed at the positions corresponding to dome switches 236 on a button substrate 234 to be described later. In this embodiment, four switch holes 224 are arranged at the four sides, respectively, about the center of the button recess 218.

The button recess 218 is also formed with a central switch hole 226 including the geometric center of the button recess 218. The central switch hole 226 is also formed at the area corresponding to a dome switch 236 of the button substrate 234. For reference, the hook slots 220 and the guide boss holes 222 are formed between the central switch hole 226 and the switch holes 224 formed the opposite ends of the button recess 218.

A main substrate 228 is installed within the case 210. The main substrate 228 has an insulation layer, on which a circuit pattern is formed, and various devices are mounted on the main substrate 228. The main substrate 228 has an area substantially corresponding to the plan area of the rear case 214 when the rear case 214 is viewed from the top of the rear case 214. For reference, the rear case 214 has an area smaller than the plan area of the rear case 214 by an area for installing a battery. A chipset, a memory, or the like may be taken as an example of such a device mounted on the main substrate 228.

A liquid crystal display panel 230 is installed within the case 210. The liquid crystal display panel 230 is located at a position corresponding to the display window 216. The display window 216 corresponding to the front face of the liquid crystal display panel 230 is equipped with a window lens 232. The window lens 232 serves to protect the liquid crystal display panel 230. The window lens 232 may be installed on the front face of the liquid crystal display panel 230 and positioned in the display window 216.

The button substrate 234 is seated on the top of the main substrate 228 at a predetermined area. The button substrate 234 is mounted on the main substrate 228 through a separate structure, for example, a spacer (not shown). The button substrate 234 and the main substrate 228 may be interconnected by a separate flexible cable (not shown).

On the button substrate 234, a plurality of dome switches 236 are installed. The dome switches 236 are formed in a dome shape and operated by being pressed by external force.

Tact switches may be employed instead of the dome switches. Of course, if the tact switches are employed, the thickness of the case 210 may be generally increased because the top of the tact switches is relatively highly positioned on the button substrate 234.

The dome switches 236 are arranged in such a manner that one of them is centrally positioned, and the others are positioned at the four sides, respectively, about the centrally positioned one. Therefore, a total of five dome switches 236 are used. For example, the centrally positioned dome switch 236 is provided for selection and execution of functions, the left and right dome switches 236 are provided for adjusting volume, and the top and bottom dome switches 236 are provided for moving a cursor.

Light sources 237 are mounted on the surface of the button substrate 234 at the areas corresponding to the peripheral areas of the dome switches 236. The light sources 237 supply light to be transmitted to the surface of the cover button plate 240 through the button indications 243 on the cover button plate 240 to be described later.

The cover button plate 240 is mounted on the button recess 218 on the front case 212. The cover button plate 240 is formed by injection-molding a synthetic resin substantially in a shape of a rectangular plate. The cover button plate 240 may include a top plate 241 and a bottom plate 241'. The top plate 241 is formed from a transparent or semi-transparent material. The top plate 241 forms the external face of the cover button plate 240. The bottom plate 241' is formed form an opaque material. The bottom plate 241' is attached to the bottom side of the top plate 241. The top plate 241 and the bottom plate 241' may be integrally fabricated by insert-injection molding or dual-injection molding.

Button indications 243 are formed on the bottom plate 241'. The button indications 243 are formed through the bottom plate 241'. The indications 243 are formed by symbols indicating functions to be executed when corresponding areas are pressed. Because the button indications 243 are formed through the bottom plate 241', the light 237 emitted from the light sources 237 is transmitted to the top plate 241. The button indications 243 are provided at the positions corresponding to the dome switches 236, respectively.

The cover button plate 240 is provided with buttons 242 at the central area thereof. The buttons 242 may be separately fabricated and mounted on the cover button plate 240 or integrally formed with the cover button plate 240 to be elastically deformable. Each of the top plate 241 and the bottom plate 241' is provided with such a button 242, wherein the buttons 242 are integrally formed in a practical product. The buttons 242 are adapted to operate the dome switch 236 centrally mounted on the button substrate 234 through the switch hole 226.

Figure 12:
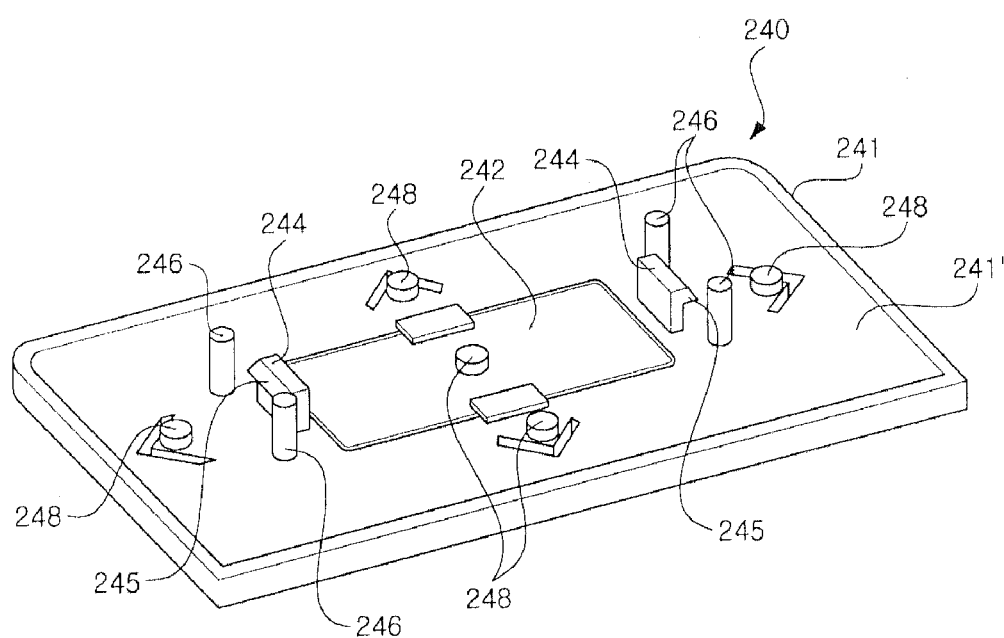
FIG. 12 is a bottom perspective view of a cover button plate of the mobile appliance shown in FIG. 11.

The construction of the rear side of the cover button plate 240 is clearly shown in FIG. 12. Referring to FIG. 12, locking hooks 244 are formed on the rear side of the cover button plate 240, and more precisely on the bottom plate 241'. The locking hooks 244 extend through the hook slots 220 in the button recess 218 and are engaged with the rear side of the front case 212. The tip end of each locking hook 244 is provided with a hook ridge 245 engaged with the rear side of the front case 212. The length of the locking hooks 244 is determined in such a manner that when the cover button plate 240 is seated on the button recess 218, the cover button plate 240 is not moved. That is, the rear side of the cover button plate 240 is substantially in tight contact with the button recess 218.

The rear side of the cover button plate 240 is formed with guide bosses 246. The guide bosses 246 extend through the guide boss holes 222 formed in the button recess 218, respectively, and the tip ends thereof are supported by the button substrate 234. The guide bosses 246 serve to prevent the cover button plate 240 from being elastically deformed at the positions corresponding to any of the dome switches 236 when the cover button plate 240 is pressed at a certain position, i.e., the position of any of the dome switches 236. For this purpose, the guide bosses 246 are formed avoiding the areas in which the dome switches are provided. For example, they are formed on the rear side of the cover button plate 240 at the positions corresponding to the areas between the switch holes 226 of the front case 212.

The rear side of the cover button plate 240 is formed with compression bosses 248. The compression bosses 248 are formed to be relatively short as compared to the guide bosses 246. The difference in length between the compression bosses 248 and the guide bosses 246 corresponds to the height of the dome switches 236. That is, in this embodiment, compression bosses 248 are formed on the rear side of the cover button plate 240 at the position corresponding to the center of the button 242 and the positions adjacent to the four sides of the button 242.

The functional action of the embodiment configured as described above will now be described in detail.

Because the assembling process of this embodiment is similar to that shown in FIG. 7, a description thereof is omitted. In this embodiment, the light emitted from the light sources 237 is transmitted to the transparent or semi-transparent top plate 241 through the button indications 243 formed on the bottom plate 241'. Therefore, because the light exiting through the button indications 243 is presented on the cover button plate 240, a user can easily confirm the button indications 243.

In addition, if the cover button plate 240 is pressed by the user and elastically deformed, a corresponding boss 246 is pressed by a corresponding dome switch 236, whereby a manipulation signal is inputted.

Figure 13:
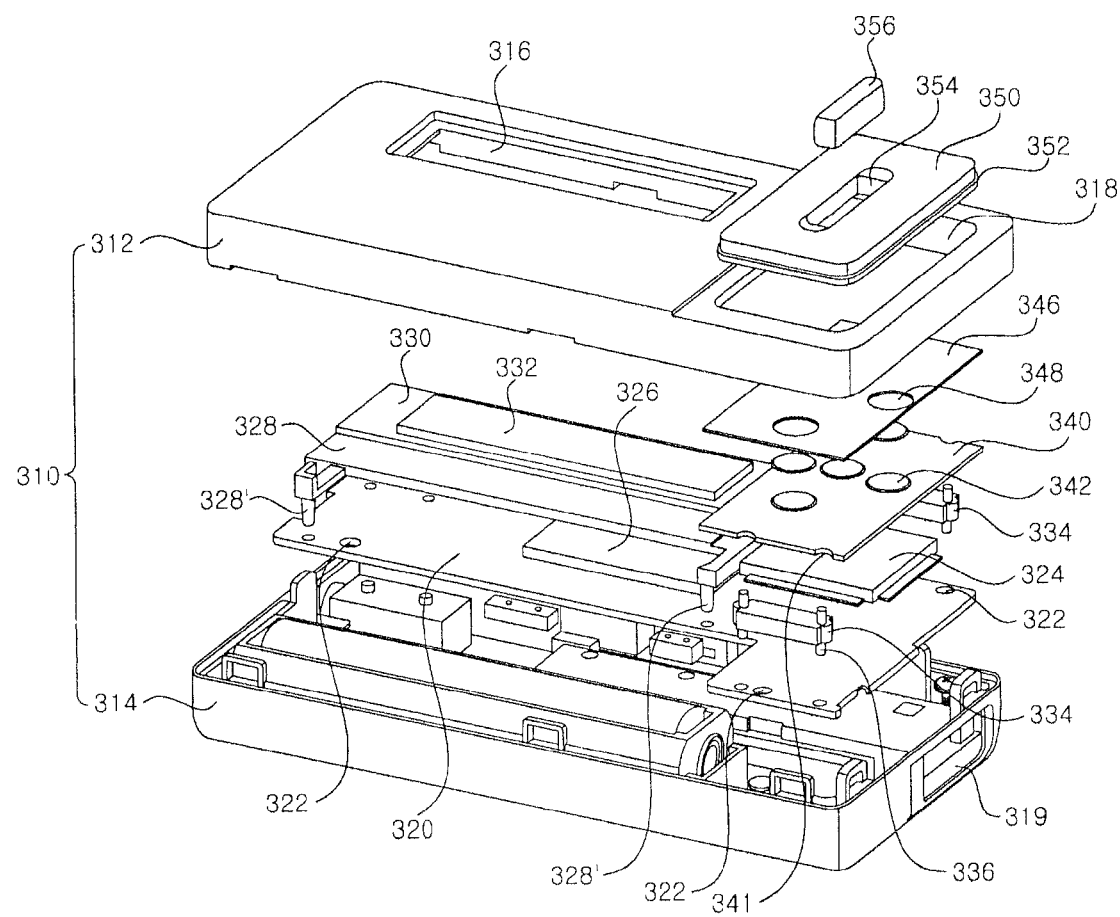
FIG. 13 is an exploded perspective view of a button apparatus and a mobile appliance employing the same according to another embodiment as broadly described herein.
Figure 14:
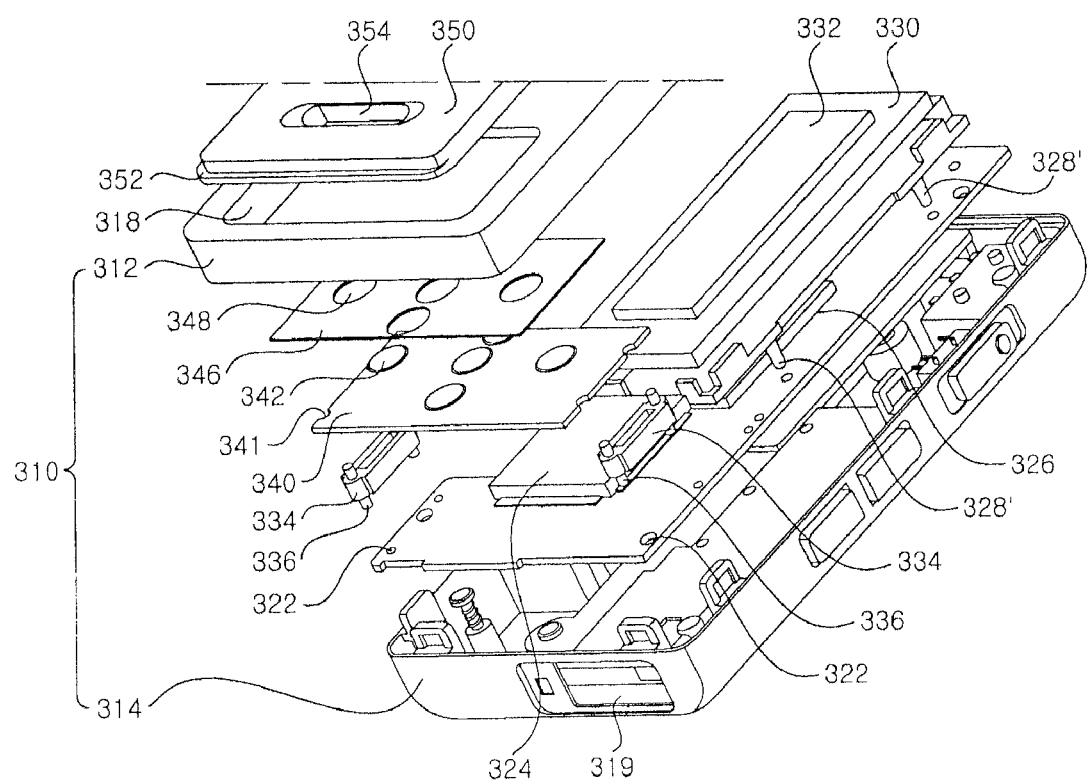
FIG. 14 is an exploded perspective view of the mobile appliance shown in FIG. 13, taken in a different direction.
Figure 15:
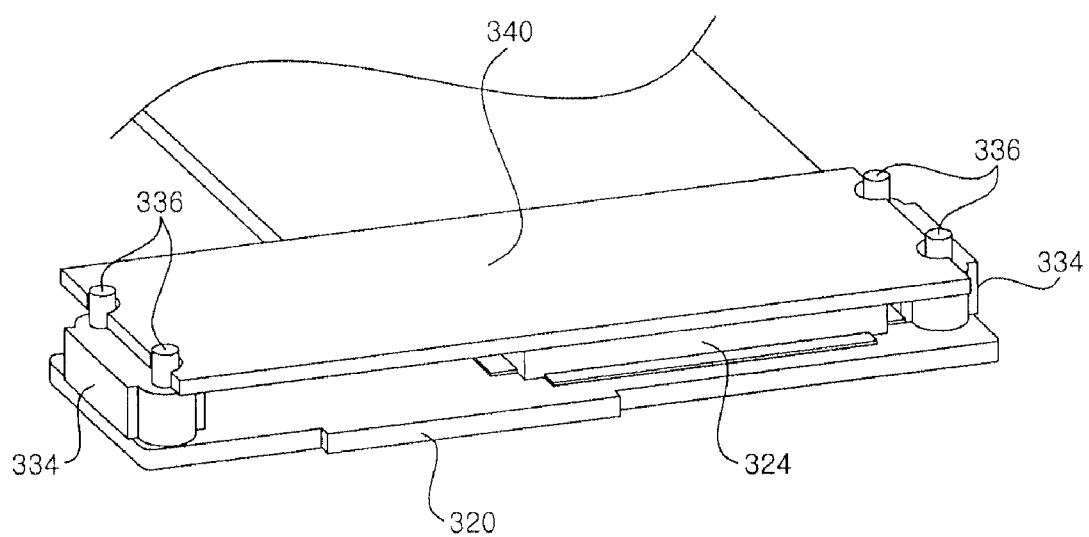
FIG. 15 is a partial perspective view of the mobile appliance shown in FIG. 13.

Next, another embodiment will be described with reference to FIGS. 13 to 15. Referring to the drawings, a case 310 forms the external appearance of a mobile appliance. The case 310 may include a front case 312 and a rear case 314. The front case 312 forms substantially the entire front face of the case 310, and partially forms the opposite side faces and the top and bottom faces of the case 310. The rear case 314 forms substantially the entire rear face of the case 310, and partially forms the opposite side faces and the top and bottom faces of the case 310. However, the case 310 is not necessarily formed by the front case 312 and the rear case 314. A space formed between the front case 312 and the rear case 314, and various components of the mobile appliance are installed within the space.

The front case 312 is formed with a display window 316 on a left or right area of the front face thereof. The display window 316 is a portion for exposing a liquid crystal display panel 330 for displaying an operating condition or the like. In this embodiment, the display window 316 is formed to extend in the vertical direction on the front case 312.

The front case 312 is formed with a button window 318. The button window 318 is a portion for positioning a button apparatus, wherein a cover button plate 350 to be described later is installed in the button window 318. The button window 318 is formed on the lower area of the front face of the front case 312.

A connector 319 is installed through a right or left part of the bottom edge of the rear case 314, and hence a right or left part of the bottom edge of the case 310. The connector 319 may be installed to be capable of being retracted into/extended from the case 310. The connector 319 may be used for data transmission with an external apparatus, for example, a computer. A USB connector may be employed as the connector 319.

A main substrate 320 is installed within the case 310. The main substrate 320 has an insulation layer, on which a circuit pattern is formed, and various devices are mounted on the main substrate 320. A plurality of insertion holes 322 are formed in the main substrate 320. Apart from the insertions holes 322, a plurality of fitting holes (no reference numerals are given) are formed in the main substrate 320.

A chipset 324 and a memory 326 may be taken as an example of such a device mounted on the main substrate 320. The chipset 324 is mounted at a position spaced from the area where the liquid crystal display panel 330 is installed, and the memory 326 is mounted at a position within the area where the liquid crystal display panel 330 is installed.

A panel frame 328 is formed from a synthetic resin, and insertion bosses 328' are formed adjacent to the four corners of the panel frame 328. The insertion bosses 328' are inserted in the insertion holes 322 formed in the main substrate 320. At the bottom side of the panel frame 328, i.e., the surface of the panel frame 328 opposite to the main substrate 320 may be formed with a recess (not shown) within which the memory 326 may be positioned.

The liquid crystal display panel 330 is seated on the panel frame 328. The liquid crystal display panel 330 is arranged at the position corresponding to the display window 361. The display window 316 corresponding to the front face of the liquid crystal display panel 330 is equipped with a window lens 332. The window lens 332 serves to protect the liquid crystal display panel 330. The window lens 332 may be mounted on the front face of the liquid crystal display panel 330 and positioned in the display window 316.

The portion of the main substrate 320 corresponding to the button window 318 is wider than any other portion of the main substrate 320. That is, the main substrate 320 has an area substantially corresponding to that of the button window 318 at the portion thereof corresponding to the button window 318, wherein the chipset 324 is mounted on the portion. Substrate spacers 334 are provided at the opposite ends of the portion of the main substrate 320 corresponding to the button window 318. The insertion bosses 338' are inserted into the insertion holes 322 in the main substrate 320 and the insertion holes 341 in the button substrate 340 to be described below.

The button substrate 340 is seated on the substrate spacers 334. The button substrate 340 is positioned above the top of the main substrate 320, on which the chipset 324 is mounted. The button substrate 340 and the main substrate 320 may be interconnected through a separate flexible cable or the substrate spacers 334. The button substrate 340 is formed with insertion holes 341, into which insertion bosses 336 are inserted, wherein the insertion bosses 336 are formed on the substrate spacers 334. The insertion holes 341 are not necessarily formed by openings, wherein each of the insertion holes 341 is formed in a cutout shape in this embodiment.

On the button substrate 340, a plurality of dome switches 342 are installed. Each of the dome switches 342 is formed in a dome shape and operated by being pressed by external force. Tact switches may be employed instead of the dome switches 342. Of course, if the tact switches are employed, the thickness of the case 310 may be generally increased because the top of the tact switches is relatively highly positioned on the button substrate 340.

The dome switches 342 are arranged in such a manner that one of them is centrally positioned, and the others are positioned at the four sides, respectively, about the centrally positioned one. Therefore, a total of five dome switches 342 are used. For example, the centrally positioned dome switch 342 is provided for selection and execution of functions, the left and right dome switches 342 are provided for adjusting volume, and the top and bottom dome switches 342 are provided for moving a cursor.

A spacer sheet 346 having an area corresponding to that of the button substrate 340 is provided. The spacer sheet 346 is formed from an elastic material and positioned between the button substrate 340 and the cover button plate 350. The spacer sheet 346 is positioned in a gap between the cover button plate 350 and the button substrate 340. Reference numeral 348 indicates through-holes formed in the spacer sheet 346. The through-holes 348 are formed at the positions corresponding to the dome switches 342, respectively.

The cover button plate 350 is positioned on the top of the spacer sheet 346. The cover button plate 350 is formed by injection-molding of a synthetic resin substantially in a rectangular plate shape. A hook ridge 352 is formed along the periphery of the cover button plate 350. The hook ridge 352 engaged with the periphery of the button window 318 formed through the front case 312, thereby preventing the cover button plate 350 from being inadvertently released from the button window 318. The cover button plate 350 is inserted into the button window 318 from the rear side of the front case 312 and positioned in the button window 318.

The cover button plate 350 is formed with compression bosses (not shown) on the rear side thereof at the positions corresponding to the dome switches 342. In this embodiment, a total of four compression bosses are formed. The front face of the cover button plate 350 is formed to be flush with the front face of the front case 312.

At the center of the cover button plate 350, a button hole 354 is formed. In the button hole 354, a button 356 is positioned for manipulating the dome switch 342 positioned at the center of the button substrate 340. The button 356 can be inserted into the button hole 354 from the rear side of the cover button plate 350 and engaged in the button hole 354, so that it cannot be released from the button hole 354 to the front side of the cover button plate 350.

The functional action of the embodiment configured as described above will now be described in detail.

At first, a description will be made as to how to assemble the mobile appliance of this embodiment. As shown in FIG. 13, the main substrate 320 is seated within the rear case 314 in a state in which components are seated in the rear case 314. Of course, the main substrate 320 is in the state in which the panel frame 328 provided with the liquid crystal display panel 330, the memory 326, the chipset 324, etc. are mounted thereon. Occasionally, the button substrate 340 may be seated on the main substrate 320 through the substrate spacers 334.

Next, the cover button plate 350 is positioned in the button window 318 formed in the front case 312. The cover button plate 350 is inserted into the button window 318 from the rear side of the front case 312 until the hook ridge 352 is engaged with the periphery of the button window 318 and the cover button plate 350 cannot move forward any more.

The spacer sheet 346 is positioned on the rear side of the cover button plate 350. The spacer sheet 350 may be attached to the rear side of the cover button plate 350. The button 356 is inserted into the button hole 354 formed through the cover button plate 350, thereby being exposed to the front side of the cover button plate 350.

In the state in which the cover button plate 350 is installed in this manner, the front case 312 is engaged with the rear case 314. As such, the liquid crystal display panel 330 positioned in the display window 316 is exposed to the outside through the window lens 332. The cover button plate 350 and the button 356 are positioned so that the rear sides thereof are opposite to the dome switches 342.

The mobile appliance of this embodiment may be used by manipulating the button apparatus as follows.

By pressing one of four sides of the cover button plate 350 about the button hole 354, a dome switch 342 corresponding to the pressed side is pressed. At this time, the cover button plate 350 is somewhat retracted while compressing the spacer sheet 346, thereby pressing the dome switch 342. Therefore, if the user removes the force pressing the cover button plate 350, the cover button plate 350 is returned to its original position by the spacer sheet 346.

Now, a description is made as to how the button apparatus is operated as a certain area of the cover button plate 350 is pressed. For example, it is possible to move a cursor displayed on the liquid crystal display panel 330 by selectively pressing the left or right part of the button 356 when the front case 312 is viewed from in front of the front case 312. By pressing the button 356, it is possible to select or execute a file at the position where the cursor is located. In addition, by pressing the cover button plate 350 at the area corresponding to the upper or lower part of the button 356, the volume can be adjusted as a corresponding dome switch 342 is pressed.

By using the substrate spacers 334, the button substrate 340 is mounted above the chipset 324, which is mounted on the top of the main substrate 320. This serves to minimize the area of the main substrate 320. In order to install the dome switches 342 on the main substrate 320 without using the button substrate 340, the area of the main substrate 320 should be increased by the area of the button substrate 340. In order to prevent this, this embodiment positions the separately fabricated button substrate 340 above the top of the main substrate 320, wherein the dome switches 342 are mounted on the button substrate 340.

In addition, when the memory 326 is mounted on the main substrate 320, the space between the panel frame 328 and the main substrate 320 is used. By this, the area of the main substrate can be also reduced. That is, the memory 326 is positioned at the area corresponding to the area for installing the liquid crystal display panel 330.

Of course, the height from the surface of the main substrate 320 may be relatively increased as the memory 326 is mounted on the main substrate 320 and the panel frame 328 is positioned above the memory 326. However, such a problem can be solved or alleviated by designing the case 310 in consideration of the height for installing the button substrate 340, so that the space formed within the case 310 can be efficiently used.

Figure 16:
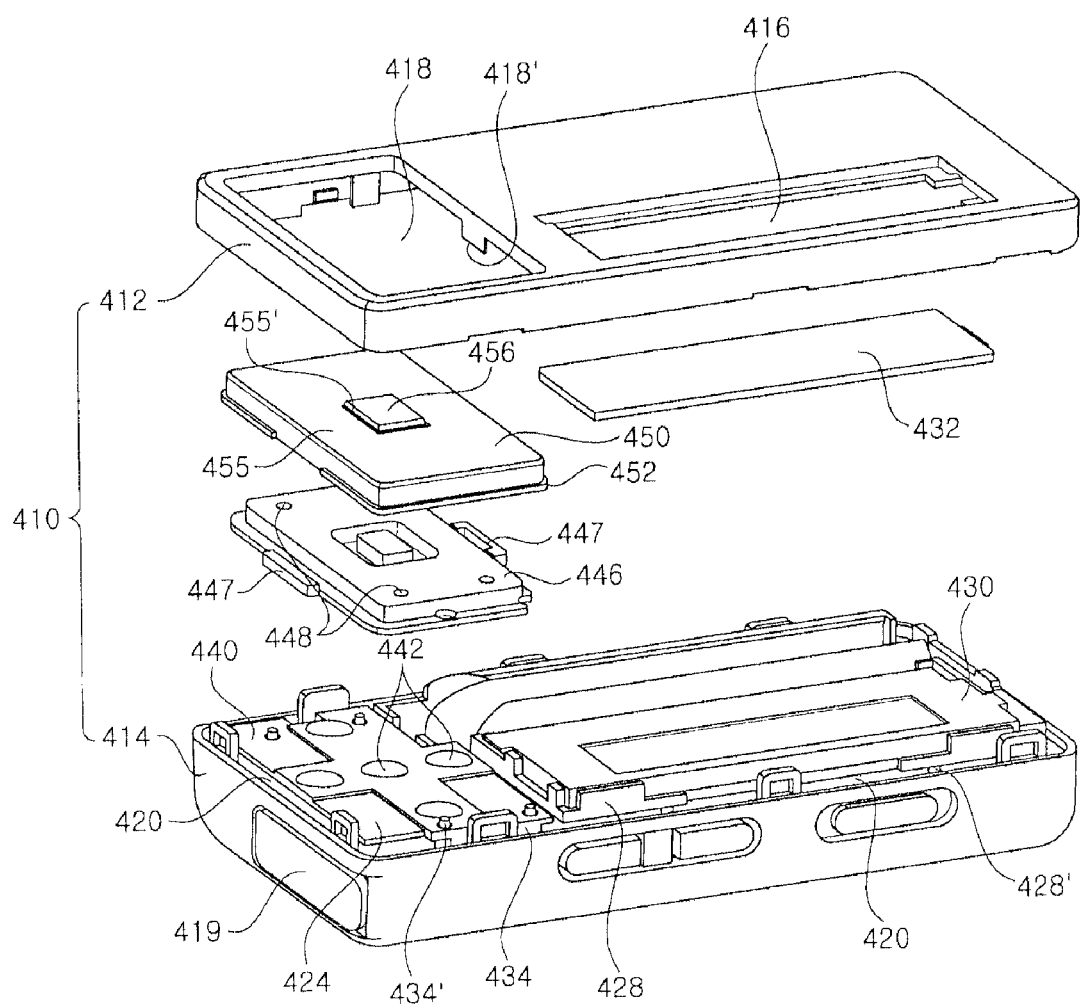
FIG. 16 is an exploded perspective view of a button apparatus and a mobile appliance employing the same according to another embodiment as broadly described herein.
Figure 17:
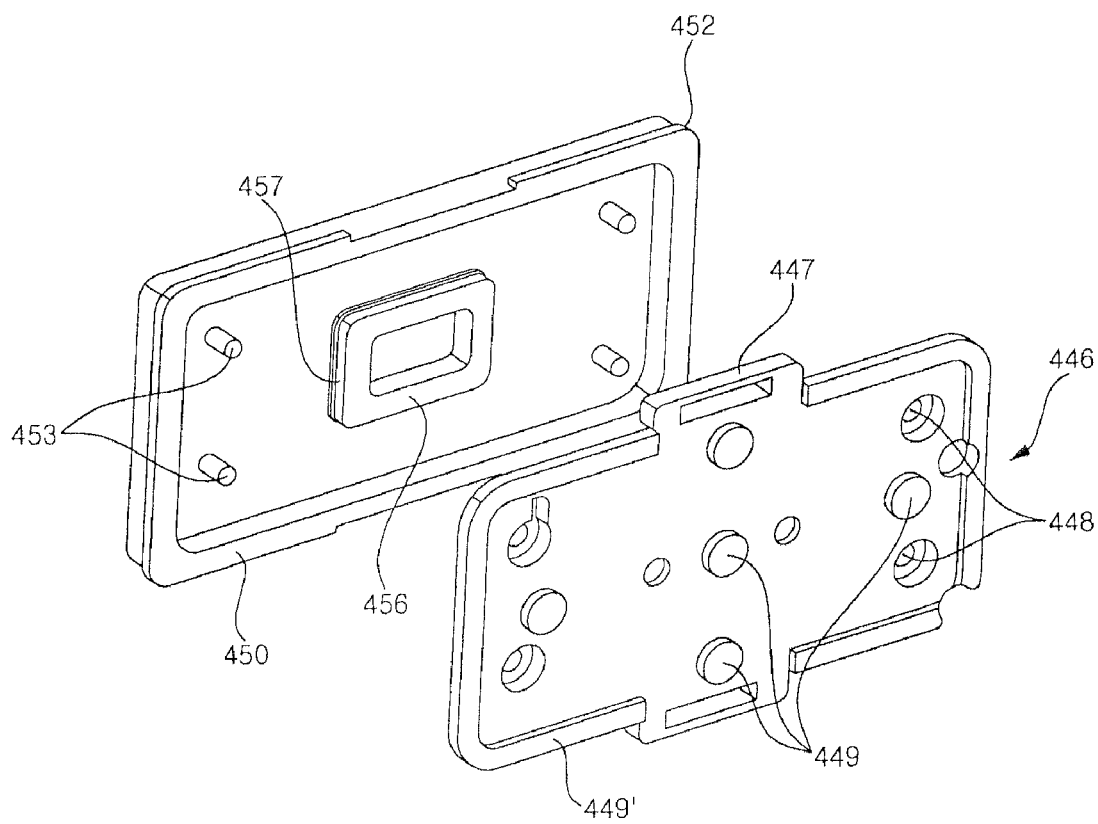
FIG. 17 is an exploded perspective view of a cover button plate and a spacer sheet of the mobile appliance shown in FIG. 16.
Figure 18:
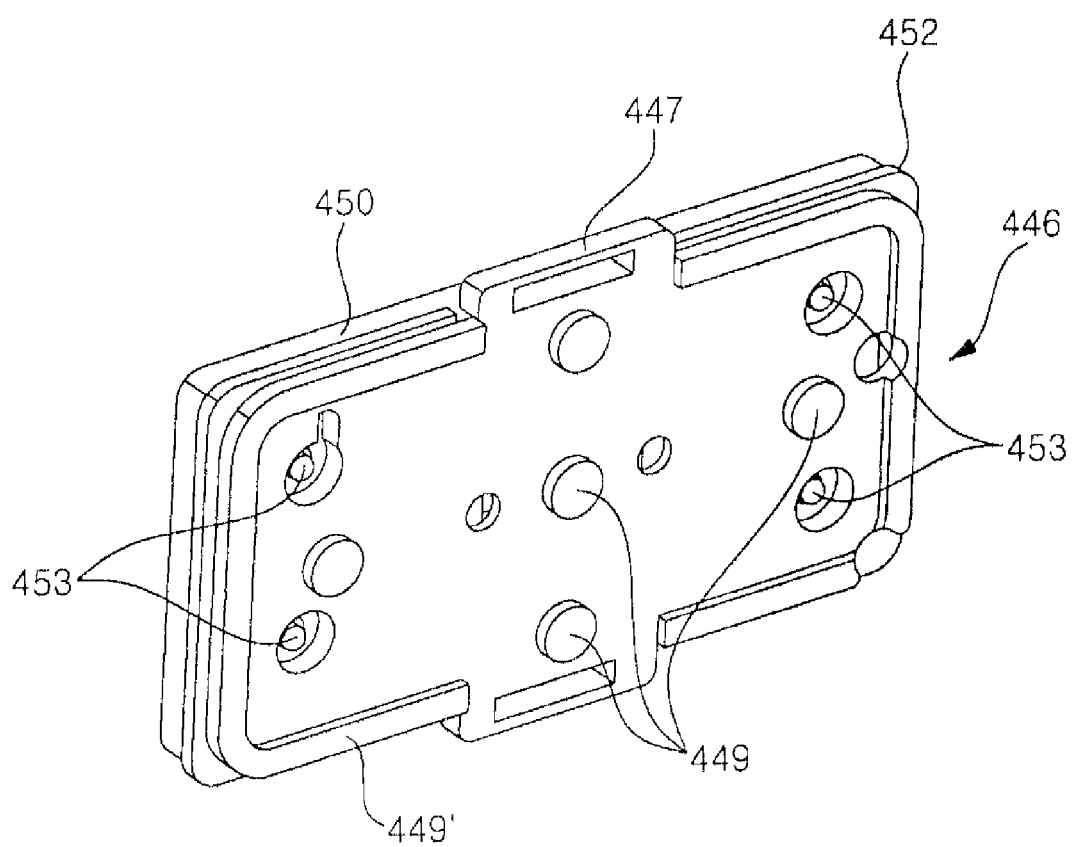
FIG. 18 is a perspective view of the cover button plate and the spacer sheet shown in FIG. 17 in an assembled state.

Next, another embodiment of will be described with reference to FIGS. 16 to 18. Referring to the drawings, a case 410 forms the external appearance of a mobile appliance. The case 410 may include a front case 412 and a rear case 414. The front case 412 forms substantially the entire front face of the case 410, and partially forms the opposite side faces and the top and bottom faces of the case 410. The rear case 414 forms substantially the entire rear face of the case 410, and partially forms the opposite side faces and the top and bottom faces of the case 410. However, the case 410 is not necessarily formed by the front case 412 and the rear case 414. A space is formed between the front case 412 and the rear case 414, and various components of the mobile appliance are installed within the space.

The front case 412 is formed with a display window 416 on a left or right area of the front face thereof. The display window 416 is a portion for exposing a liquid crystal display panel 430 for displaying an operating condition or the like. In this embodiment, the display window 416 is formed to extend in the vertical direction on the front case 412.

The front case 412 is formed with a button window 418. The button window 418 is a portion for positioning a button apparatus, wherein a cover button plate 450 to be described later is installed in the button window 418. The button window 418 is formed on the lower area of the front face of the front case 412. At least one welding pieces 418' is formed on and project backward (in the drawing, downward) from the rear side of the front case 412 at an area corresponding to an edge of the button window 418.

A connector 419 is installed through a right or left part of the bottom edge of the rear case 414, and hence a right or left part of the bottom edge of the case 410. The connector 419 may be installed to be capable of being retracted into/extended from the case 410. The connector 419 may be used for data transmission with an external apparatus, for example, a computer. A USB connector may be employed as the connector 419.

A main substrate 420 is installed within the case 410. The main substrate 420 has an insulation layer, on which a circuit pattern is formed, and various devices are mounted on the main substrate 420. The main substrate 420 has an area occupying most of all the plan area of the space formed within the case 410.

A chipset 424 and a memory (not shown) may be taken as an example of such a device mounted on the main substrate 420. The chipset 424 is mounted at a position spaced from the area where the liquid crystal display panel 430 is installed, and the memory is mounted at a position within the area where the liquid crystal display panel 430 is installed.

A panel frame 428 is formed from a synthetic resin, and insertion bosses 428' are formed adjacent to the four corners of the panel frame 428. The insertion bosses 428' are inserted in insertion holes formed in the main substrate 420. At the bottom side of the frame panel 428, i.e., the surface of the frame panel 428 opposite to the main substrate 420 may be formed with a recess (not shown) within which the memory 326 (shown in FIGS. 13 and 14) may be positioned.

The liquid crystal display panel 430 is seated on the panel frame 428. The liquid crystal display panel 430 is arranged at the position corresponding to the display window 416. The display window 416 corresponding to the front face of the liquid crystal display panel 430 is equipped with a window lens 432. The window lens 432 serves to protect the liquid crystal display panel 430. The window lens 432 may be mounted on the front face of the liquid crystal display panel 430 and positioned in the display window 416.

The chipset 424 is mounted on the portion of the main substrate 420 corresponding to the button window 418. The portion corresponding to the button window 418 is positioned adjacent to a portion where the panel frame 428 is seated.

The button substrate 440 is seated above the portion of the main substrate 420 where the chipset 424 is seated. The button substrate 440 may be installed on the top of the main substrate 420 in such a manner that the opposite ends thereof are supported by substrate spacers 434 provided on the main substrate 420. The button substrate 440 and the main substrate 420 may be interconnected through a separate flexible cable. Each of the substrate spacers 434 is formed with an insertion projection 434', which is inserted into insertion holes (not denoted by a reference numeral) formed in the main substrate 420 and the button substrate 440.

On the button substrate 440, a plurality of dome switches 442 are installed. Each of the dome switches 442 is formed in a dome shape and operated by being pressed by external force. Tact switches may be employed instead of the dome switches 442. Of course, if the tact switches are employed, the thickness of the case 410 may be generally increased because the top of the tact switches is relatively highly positioned on the button substrate 440.

The dome switches 442 are arranged in such a manner that one of them is positioned substantially at the center of the button substrate 440, and the others are positioned at the four sides, respectively, about the centrally positioned one. Therefore, a total of five dome switches 442 are used. For example, the centrally positioned dome switch 442 is provided for selection and execution of functions, the left and right dome switches 442 are provided for adjusting volume, and the top and bottom dome switches 442 are provide for moving a cursor.

A spacer sheet 446 is provided on the top of the button substrate 440. The spacer sheet 446 is formed from an elastic material and positioned between the button substrate 440 and a cover button plate 450 to be described below. The spacer sheet 446 may be formed from rubber, for example.

The spacer sheet 446 is formed with welding hooks 447. The welding hooks 447 are used for connecting the spacer sheet 446 to the front case 412. The welding pieces 418' are inserted through the welding hooks 447, and then the tip ends of the welding pieces 418' are molten and solidified, whereby the welding pieces 418' are not released from the welding hooks 447. At this time, the spacer sheet 446 is somewhat movable in relation to the front case 412.

The spacer sheet 446 is formed with a plurality of projection insertion holes 448. Welding projections 453 formed on the cover button plate 450 to be described below are inserted into the projection insertion holes 448. The spacer sheet 446 is connected with both the front case 412 and the cover button plate 450.

Compression projections 449 are formed on the face of the spacer sheet 446 opposite to the button substrate 440. The compression projections directly press the dome switches 442, respectively. The top side of the spacer sheet 446 is formed with prominence and depression to be complementary with the shape of the bottom side of the cover button plate to be described later.

Along the peripheral area of the surface of the spacer sheet 446 opposite to the button substrate 440, a support ridge 449' is formed. The support ridge 449' is directly seated on the button substrate 440. The support ridge 449' slightly more highly projects than the compression projections 449.

The cover button plate 450 is formed by injection-molding of a synthetic resin substantially in a rectangular plate shape. A hook ridge 452 is formed along the periphery of the cover button plate 450. The hook ridge 452 is engaged with the periphery of the button window 418 formed through the front case 412, thereby preventing the cover button plate 450 from being inadvertently released from the button window 418. The cover button plate 450 is inserted into the button window 418 from the rear side of the front case 412 and positioned in the button window 418. It is desired that the surface of the cover button plate 450 is flush with the adjacent surface of the front case 412 when the cover button plate 450 is installed in the front case 412.

The cover button plate 450 is formed with a plurality of welding projections 453 for assembling the spacer sheet 446. The welding projections 453 are inserted through the projection holes 448 formed in the spacer sheet 446 and then the tip ends thereof are welded. As a result, the spacer sheet 446 and the cover button plate 450 are assembled with each other.

The peripheral rectangular area with a predetermined width on the top surface of the cover button plate 450 is referred to as a button surrounding area 455. The button surrounding area 455 corresponds to the dome switches mounted on the area corresponding to the peripheral area of the button substrate 440. The compression projections 449 are positioned on the bottom side of the cover plate 450 at the area corresponding to the button surrounding area 455.

At the center of the cover button plate 450 surrounded by the button surrounding area 455, a button hole 455' is formed substantially in a rectangular shape. In the button hole 455', a central button 456 is positioned, which has a rectangular shape when shown in a top plan view. The central button 456 can be inserted into the button hole 455' from the rear side of the cover button plate 450. The central button 456 is formed with a hooking ridge 457 extending around the bottom edges thereof, wherein the hooking ridge 457 is engaged with the peripheral edges of the button hole 455'.

The functional action of the embodiment configured as described above will now be described in detail.

At first, a description will be made as to how to assemble the mobile appliance of this embodiment. As shown in FIG. 16, the main substrate 420 is seated within the rear case 414 in a state in which components are seated in the rear case 414. Of course, the main substrate 420 is in the state in which the panel frame 428 provided with the liquid crystal display panel 430, the memory, the chipset 424, etc. are mounted thereon. Occasionally, the button substrate 440 may be seated on the main substrate 420.

Next, the cover button plate 450 with the spacer sheet 446 affixed to the rear side thereof is positioned in the button window 418 formed in the front case 412, and then the welding pieces 418' are welded. The cover button plate 450 is inserted into the button window 418 from the rear side of the front case 412 until the hook ridge 452 is engaged with the periphery of the button window 418 and the cover button plate 450 cannot move forward any more.

Here, the spacer sheet 446 is in a position in which it is in tight contact with the cover button plate 450, thereby being fixed, but the spacer sheet 446 is somewhat movably connected to the front case 412. Therefore, the hooking edge 452 of the cover button plate 450 restrains the projection of the cover button plate 450 and the spacer sheet 446 in front of the front case 412. In addition, as the welding hooks 447 are connected to the welding pieces 418', the cover plate 450 or the like is not inadvertently retracted backward from the front case 412 positioned on the rear side of the cover button plate 350.

In the state in which the cover button plate 450 is installed in this manner, the front case 412 is engaged with the rear case 414. As such, the liquid crystal display panel 430 positioned in the display panel 416 is exposed to the outside through the window lens 432. The cover button plate 450 and the button 456 are positioned so that the rear sides thereof are opposite to the dome switches 442.

The mobile appliance of this embodiment may be used by manipulating the button apparatus as follows.

By pressing any one side of the button surrounding area 455 of the cover button plate 450 or the central button 456, a dome switch 442 corresponding to the pressed side or the central button 456 is pressed. That is, if any one side of the button surrounding area 455, the cover button plate 450 is somewhat retracted while compressing the spacer sheet 446, thereby pressing the corresponding dome switch 442. This action is enabled because the support edge 449' exists along the peripheral edges of the spacer sheet 446. If the user removes the force pressing the cover button plate 450, the cover button plate 450 is returned to its original position by the spacer sheet 446.

This is the same when the central button 456 is pressed. That is, if the central button 456 is pressed, the compression projection 449 positioned at the rear side of the central button 456 presses the corresponding dome switch 442. If the force pressing the central button 456 is removed, the spacer sheet 446 returns to its original position, thereby returning the central button to its original position.

Now, a description is made as to how the button apparatus is operated as a certain area of the cover button plate 450 is pressed. For example, it is possible to move a cursor displayed on the liquid crystal display panel 430 by selectively pressing the left or right part of the button 456 when the front case 412 is viewed from in front of the front case 412. By pressing the button 456, it is possible to select or execute a file at the position where the cursor is located. In addition, by pressing the cover button plate 450 at the area corresponding to the upper or lower part of the button 456, the volume can be adjusted as a corresponding dome switch 442 is pressed.

Meanwhile, the button substrate 440 is mounted above the chipset 424, which is mounted on the top of the main substrate 420. This serves to minimize the area of the main substrate 420. In order to install the dome switches 442 on the main substrate 420 without using the button substrate 440, the area of the main substrate 420 should be increased by the area of the button substrate 440. In order to prevent this, the present embodiment positions the separately fabricated button substrate 440 above the top of the main substrate 420, wherein the dome switches 442 are mounted on the button substrate 440.

According to the embodiments as described above, it is possible to obtain various effects as follows.

At first, in a button apparatus as embodied and broadly described herein, a cover button plate forms the external appearance thereof, and if a first button part or a second button part is pressed, a compression boss extending through a front case manipulates a switch mounted on a substrate, so that a desired function can be effected. Therefore, no button projects from the external appearance of the button apparatus. In addition, because the cover button plate forms a continuous surface with the surface of the front case, the external appearance is relatively neat and tidy, whereby consumers' demands concerning the design can be satisfied.

In addition, according to embodiments as broadly described herein, components such as buttons do not project from the surface of the cover button plate of the button apparatus, whereby the malfunction of the button apparatus by inadvertent external force does not occur. Therefore, even if a user carries a mobile appliance in a state in which the mobile appliance is received within a bag or a pocket, it is possible to prevent the button apparatus from being inadvertently operated by external force in advance, whereby the malfunction of the button apparatus does not occur.

Furthermore, according to embodiments as broadly described herein, even though components such as buttons do not project from the surface of the cover button plate of a button apparatus, button indications are illuminated by one or more light sources. As a result, a user can easily recognize the buttons, in particular, even in the dark, whereby the convenience in using the button apparatus can be greatly enhanced.

Next, according to embodiments as broadly described herein, it is possible only to employ locking hooks on the front case of the button apparatus. As a result, the number of components of the button apparatus can be minimized, and the assembling workability can be enhanced.

In addition, according to embodiments as broadly described herein, a button substrate with switches is installed above the top of the main substrate, on which a memory and a chipset are mounted, with a predetermined gap between the button substrate and the main substrate. As a result, the area of the main substrate can be relatively reduced, which allows the entire size of a mobile appliance to be relatively miniaturized.

Moreover, according to embodiments as broadly described herein, the cover button plate is exposed to the outside through a button window formed in the front case. Except a central button hole, the surface of the cover button plate is flushed with the surface of the front case and no projecting structure exists. As a result, the cover button plate can be more freely designed, so that more various appearance designs can be provided.

A button apparatus for a mobile appliance is provided which does not project from a surface of the mobile appliance.

A button apparatus for a mobile appliance is provided, the buttons of which are adapted to manipulate text positions by being pressed by a user, wherein the button apparatus allows the user to easily recognize the buttons although it does not project from a surface of the mobile appliance.

A mobile appliance is provided that is miniaturized.

A mobile appliance is provided, the external appearance of which can be more variously designed.

A button apparatus for use in a mobile appliance is provided that has increased endurance.

A button apparatus may include a cover button plate elastically deformable by external force and having a button area, the button are being formed by one or more compression bosses formed on and extending from the rear side of the button area; a button recess formed on a surface of a case forming an external appearance of the button apparatus, the cover button plate being seated on the button recess and the compression bosses extending through the cover button plate; and one or more switches positioned behind the case and manipulated by the compression bosses.

The button recess has one or more boss holes, which are formed in such a manner that the compression bosses extend through the boss holes, at least one pair of hook holes formed at the opposite ends of the button recess, respectively, each of the hook holes being formed by a slit perpendicular to the bottom edge of the button recess and a slit parallel to the bottom edge of the button, which is broader than the slit perpendicular to the bottom edge, and one or more fitting holes for use in assembling the cover button plate to the button recess, and wherein the cover button plate has at least one pair of slide hooks engaged in the fitting holes, respectively, the slide hooks being formed at the opposite ends of the rear side of the cover button plate, and one or more fitting holes formed at the positions corresponding to the fit holes of the button recess.

A hook groove is formed on the case adjacent to the button recess, and a first hook ridge is formed on and projects from the cover button plate, the first hook ridge being engaged in the hook groove as the cover button plate sliding along the button recess.

Each of the slide hooks has two vertical walls vertically extending from the rear side of the cover button plate and one horizontal wall formed on the top ends of the two vertical walls, the horizontal walls of the slide hooks coming into tight contact with the rear side of the button recess, thereby being hooked on the rear side of the button recess, and the slide hooks positioned at the opposite ends of the cover button plate being symmetrically arranged.

The button apparatus may also include one or more light sources mounted on the substrate, and one or more button indications at the button area, through which the light emitting from the light sources permeates to the outside of the cover button plate.

When the cover button plate is seated in the button recess, the surface of the cover button plate and the surface of the case forms a continuous flat surface.

A button hole is formed through the cover button plate, a multi-function button hole is formed in the button recess at the position corresponding to the button hole, and a multi-function button cooperating a multi-function switch mounted on the substrate is installed on the rear side of the button recess at the position corresponding to the multi-function button hole.

A mobile appliance may include a case forming the external appearance of the mobile appliance; a button recess formed at a predetermined area of the case by depressing the case at the area; a cover button plate assembled to the case by being slid along the surface of the button recess and seated in the button recess, the surface of the cover button plate forming a continuous flat surface with the surface of the case; a button area formed to be flat and elastically deformable on the surface of the cover button plated, the button area having one or more compression bosses formed on the rear side of the button area; and one or more switches provided within the case and manipulated through the compression bosses, respectively.

Dome switches or tact switches are employed as the switches.

The mobile appliance may also include one or more light sources mounted on the substrate, and one or more button indications at the button area, through which the light emitting from the light sources permeate to the outside of the cover button plate.

The mobile appliance may also include one or more light passages in the button recess, the light passages transmitting the light of the light sources between the cover button plate and the substrate.

A button apparatus may include a cover button plate elastically deformable by external force, the cover button plate having one or more locking hooks and one or more compression bosses, which are formed on and project from the rear side of the cover button plate; a button recess formed on the surface of a case forming an external appearance, the button recess being depressed by the height of the cover button plate, the cover button plate assembled to the button recess by the locking hooks and the compression bosses extending through the button recess; and one or more switch positioned rear side of the case and manipulated through the compression bosses.

Each of the locking hooks is elastically deformable and has a hook ridge at the tip end thereof, the locking hooks extending through hook slots formed through the button recess, so that the hook ridges are hooked to the inner side of the case corresponding to the rear side of the button ridge.

The cover button plate is formed with one or more guide bosses on the rear side thereof, each of the guide bosses extending through the button recess of the case and supported on the substrate at a position away from the switches mounted on the substrate, The button apparatus may also include a button provided through the center of the cover button plate, the compression bosses being formed on the rear side of the cover button plate at the areas corresponding to the four sides about the button and on the rear side of the button.

The button recess is formed with switch holes at the positions corresponding to the compress bosses, so that the switches and the compression bosses are capable of getting in touch with each other.

The cover button plate comprises a top plate formed from a transparent or semi-transparent material and a bottom plate formed from an opaque material, the top and bottom plates being integrally formed, and one or more button indications being formed through the bottom plate at the position corresponding to the switches.

The locking hooks and the compression bosses are formed on the rear side of the bottom plate, and the guide bosses are formed on the rear side of the bottom plate away from the positions corresponding to the switches, so that the tip ends of the guide bosses are supported by the substrate, on which the switches are mounted.

Light sources are installed on the substrate around the switches so as to provide light to the button indications.

A mobile appliance may include a case forming the external appearance of the mobile appliance; a button recess formed at a predetermined area of the case by depressing the case at the area; a cover button plate assembled to the case by being seated in the button recess, the surface of the cover button plate forming a continuous flat surface with the surface of the case, the cover button plate having one or more compression bosses formed on the rear side thereof and extending through the button recess, wherein the cover button plate is elastically deformable at the areas corresponding to the positions of the compression bosses; and a button area formed to be flat and elastically deformable on the surface of the cover button plated, the button area having one or more compression bosses formed on the rear side of the button area; and one or more switches provided within the case and manipulated through the compression bosses, respectively.

The mobile appliance may also include one or more guide bosses formed on the rear side of the cover button plate, the guide bosses extending through the case and the tip ends of the guide bosses being supported on a substrate, on which the switches are mounted.

The cover button plate may include a top plate formed from a transparent or semi-transparent material and a bottom plate formed from an opaque material, the top and bottom plates being integrally formed, and one or more button indications being formed through the bottom plate.

The mobile appliance may also include one or more light sources for transmitting light in front of the cover button plate through the button indications, the light sources mounted on the substrate, on which the switches are mounted.

A button apparatus may include a cover button plate exposed in front of a front case through a button window, the cover button plate being operated by being pressed at a predetermined area; a button substrate installed behind the cover button plate, a plurality of switches being mounted on the button substrate, so that the switches being manipulated by being pressed by the cover button plate; and a spacer sheet formed from an elastically deformable material and positioned at a gap between the button substrate and the cover button plate.

The cover button plate is inserted into the button window from the rear side of the front case, a locking ridge being formed along the edges thereof so that the locking ridge is engaged with the edges of the button window.

The cover button plate is formed in a rectangular plate shape and formed with a button hole at the central area thereof, a button for manipulating one of the switches mounted on the button substrate being mounted in the button hole.

The switches are dome switches.

The spacer sheet is formed with through-holes at the positions corresponding to the dome switches.

A mobile appliance may include a case forming the external appearance of the mobile appliance; a main substrate installed within the case, components such as a chipset and a memory being mounted on the main substrate; a liquid crystal display panel mounted on the main substrate and exposed to a display window formed to be opened through a face of the case; and a button apparatus, wherein the button apparatus comprises: a cover button plate exposed the button window formed on the face of the case and operated by being pressed at a predetermined area by external force, a button substrate installed behind the cover button plate, a plurality of switches being mounted on the button substrate, so that the switches being manipulated by being pressed by the cover button plate, and a spacer sheet formed from an elastically deformable material and positioned at a gap between the button substrate and the cover button plate.

The case comprises a front case, through which the display window and the button window are formed, and a rear case assembled to the front case, so that a space is formed between the front case and the rear case.

The button substrate is supported by a plurality of substrate spacers above the main substrate, and the chipset is mounted on the main substrate below the button substrate.

The liquid crystal display panel is seated on a panel frame mounted on the main substrate, and the memory is mounted at a predetermined area between the panel frame and the main substrate.

The cover button plate is inserted into the button window from the rear side of the front case, and formed with a locking ridge along the edges thereof so that the locking ridge is engaged with the edges of the button window.

The cover button plate is formed in a rectangular plate shape and formed with a button hole at the central area thereof, a button for manipulating one of the switches mounted on the button substrate being mounted in the button hole.

The switches are dome switches.

The spacer sheet is formed with through-holes at the positions corresponding to the dome switches.

A button apparatus may include cover button plate comprising a central button at the central area thereof and a peripheral button area surrounding the central area, the cover button plate being exposed in front of a front case through a button window; a button substrate installed behind the cover button plate, a plurality of switches pressed and manipulated by the operation of the peripheral button area and the central button being mounted on the button substrate; and a spacer sheet formed from an elastically deformable material and mounted on the rear side of the cover button plate, the spacer sheet being formed with compression projections at the positions corresponding to the switches and supported by the button substrate.

The cover button plate is inserted into the button window from the rear side of the front case, and formed with a locking ridge along the edges thereof so that the locking ridge is engaged with the edges of the button window.

The cover button plate is formed in a rectangular plate shape and formed with a button hole at the center thereof, and the surface of the peripheral button area surrounding the edges of the central button is formed to be flushed with the surface of the front case.

The central button has a substantially rectangular surface and is inserted and engaged in a button hole formed through the cover button plate from the rear side of the cover button plate.

The cover button plate and the space sheet are formed with prominence and depression on the correspondingly opposite surfaces thereof to be complementarily engaged with each other.

The compression projections are formed on the rear side of the space sheet at the positions corresponding to the switches.

A support ridge is formed on the rear side of the spacer sheet along the edges thereof, the support ridge projecting higher than the compression projections and being in tight contact with the button substrate.

Welding hooks are formed at the opposite ends of each of the edges of the spacer sheet, and welding pieces are formed on the inner surface of the case at the positions corresponding to the edges of the button window, the welding pieces being inserted into and welded to the welding hooks.

The switches are dome switches.

A mobile appliance may include a case forming the external appearance of the mobile appliance; a main substrate installed within the case, components such as a liquid crystal display panel and a chipset being mounted on the main substrate; a liquid crystal display panel mounted on the main substrate and exposed through a display window opened through a face of the case; a button apparatus, wherein the button apparatus comprising: a cover button plate comprising a central button at the central area thereof and a peripheral button area surrounding the central area, the cover button plate being exposed in front of a front case through a button window; a button substrate installed behind the cover button plate, a plurality of switches pressed and manipulated by the operation of the peripheral button area and the central button being mounted on the button substrate; and a spacer sheet formed from an elastically deformable material and mounted on the rear side of the cover button plate, the spacer sheet being formed with compression projections at the positions corresponding to the switches and supported by the button substrate.

The case may include a front case, through which the display window and the button window are formed, and a rear case assembled to the front case, so that a space is formed between the front case and the rear case.

The button substrate is installed above the main substrate with a predetermined space being formed between the button substrate and the main substrate.

The chipset is mounted on the main substrate and below the button substrate.

The liquid crystal panel is seated on a panel frame mounted on the main substrate, and the memory is mounted at an area between the panel frame and the main substrate.

The cover button plate is inserted into the button window from the rear side of the front case, and formed with a locking ridge along the edges of thereof, so that the locking ridge is engaged with the edges of the button window.

The cover button plate is formed in a rectangular plate shape and formed with a button hole at the center thereof, and the surface of the peripheral button area surrounding the edges of the central button is formed to be flushed with the surface of the front case, the central button being inserted into the button hole from the rear side of the cover button plate.

The cover button plate and the space sheet are formed with prominence and depression on the correspondingly opposite surfaces thereof to be complementarily engaged with each other, and the spacer sheet is formed with a support edge on the rear side along the edges thereof, the support edge being in tight contact with the button substrate.

Welding hooks are formed at the opposite ends of each of the edges of the spacer sheet, and welding pieces are formed on the inner surface of the case at the positions corresponding to the edges of the button window, the welding pieces being inserted into and welded to the welding hooks.

The switches are dome switches.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A button apparatus, comprising:
    a rear plate;
    a cover plate coupled to the rear plate so as to form an installation space therebetween, the cover plate having a button area, the button area including at least one compression boss that protrudes rearward from a rear surface of the button area;
    a button recess formed in a front surface of a casing portion of the button apparatus, wherein the cover plate is positioned on a front surface of the button recess such that a front surface of the cover plate and an adjacent front surface of the casing portion form a substantially continuous surface, wherein the button recess comprises:
        at least one pair of hook holes formed at opposite ends of the button recess;
        at least one fitting hole extending through the button recess; and
        a multi-function button hole extending through the button recess;
    at least one hole formed in the button recess, corresponding to the at least one compression boss, wherein the at least one hole extends from the front surface of the button recess through to a rear surface of the button recess formed by a rear surface of the casing portion, wherein the at least one compression boss extends through the at least one hole in the button recess; and
    at least one switch provided on a substrate positioned at a rear side of the casing portion of the button apparatus, in the installation space formed between the rear plate and the cover plate, wherein a position of the at least one switch on the substrate corresponds to a position of the at least one compression boss that extends through the at least one hole in the button recess such that the at least one compression boss contacts the at least one switch and manipulates the at least one switch.

2. The apparatus of claim 1, wherein the cover plate comprises:
    at least one pair of slide hooks provided on opposite ends of the rear surface of the cover plate and configured to engage the at least one pair of hook holes formed in the button recess;
    at least one fitting hole formed in the rear surface of the cover plate, at a position corresponding to the at least one fitting hole formed in the button recess; and a button hole extending through the cover plate, at a position corresponding to the multi-function button hole in the button recess.

3. The apparatus of claim 2, wherein each of the hook holes comprises:
   a first slit that is perpendicular to a bottom edge of the button recess; and
   a second slit that extends perpendicularly from a lower end of the first slit and parallel to the bottom edge of the button recess, wherein a width of the second slit is greater than a width of the first slit.

4. The apparatus of claim 3, wherein each of the slide hooks comprises:
   a first vertical wall that extends rearward from the rear surface of the cover plate, perpendicular to a bottom edge of the cover plate;
   a second vertical wall that extends rearward from the rear surface of the cover plate and perpendicular from an end of the first vertical wall such that the second vertical wall is parallel to the bottom edge of the cover plate and mating ends of the first and second vertical walls form a corner; and
   a top wall that extends between the first and second vertical walls.

5. The apparatus of claim 4, wherein the pair of hook holes and the pair of slide hooks are symmetrically arranged on the button recess and the cover plate, respectively, such that the first and second slits are configured to slidably receive the first and second vertical walls respectively therethrough so as to position the horizontal wall in close contact with the rear surface of the button recess and hook the cover plate to the button recess.

6. The apparatus of claim 1, further comprising a multi-function button operably coupled to a multi-function switch provided on a substrate positioned to a rear of the button recess, wherein the multi-function button extends through the multi-function button hole formed in the button recess and the button hole formed in the cover plate, wherein the multi-function button is moveable in a plurality of directions and is configured to actuate the multi-function switch to select a function from a plurality of functions based on a movement direction thereof.

7. The apparatus of claim 1, further comprising at least one button indicator provided with the button area of the cover plate, and at least one light source provided on the substrate, wherein light emitted by the at least one light source illuminates the at least one button indicator.

8. The apparatus of claim 1, wherein the at least one hole in the button recess comprises a plurality of switch holes, including a central switch hole provided in a central portion of the button recess, and a plurality of peripheral switch holes spaced apart from the central switch hole.

9. The apparatus of claim 8, wherein the at least one compression boss comprises a plurality of compression bosses extending rearward from the rear surface of the cover plate, and each aligned with a corresponding switch hole in the button recess.

10. The apparatus of claim 9, wherein the at least one switch comprises a plurality of dome switches, and wherein depression of a portion of the button area causes a corresponding compression boss to extend through the corresponding switch hole and contact and actuate a corresponding dome switch.

11. The apparatus of claim 9, further comprising a plurality of button indicators provided with the cover plate, at portions of the cover plate corresponding to the plurality of compression bosses, and at least one light source provided on the substrate, wherein light emitted by the at least one light source illuminates the plurality of button indicators, and wherein cover plate comprises:
   a bottom plate that includes the plurality of indicators and the plurality of compression bosses; and
   a top plate positioned on the bottom plate, wherein illumination of the plurality of indicators is visible through the top plate.

12. The apparatus of claim 1, wherein the cover plate comprises a pair of elastically deformable locking hooks that extend rearward from the rear surface of the cover plate, wherein each of the pair of locking hooks comprises a shank portion that extends from the rear surface of the cover plate and a hook ridge that extends from a distal end of the shank portion.

13. The apparatus of claim 12, wherein the button recess comprises a pair of hook slots extending therethrough and positioned corresponding to the pair of locking hooks provided with the cover plate, wherein the pair of locking hooks are configured to be slidably inserted through the pair of hook slots such that the hook ridge is secured against a rear surface of the button recess.

14. The apparatus of claim 1, wherein the cover plate further comprises a plurality of guide bosses that extend rearward from the rear surface of the cover plate and through corresponding guide boss holes in the button recess such that distal ends thereof are supported on the substrate, wherein the plurality of guide bosses maintain a position of a portion of the cover plate outside of the button area relative to the button recess and the at least one switch such that only depression of the button area actuates the at least one switch.

15. A mobile terminal comprising the button apparatus of claim 1.

16. A button apparatus for a mobile terminal, the button apparatus comprising:
   a cover plate including a button area;
   at least one compression boss that protrudes rearward from a rear surface of the button area of the cover plate;
   a button recess formed in a front surface of a casing, wherein the cover plate is positioned in the button recess with the rear surface of the cover plate facing a front surface of the button recess;
   at least one hole formed in the button recess, wherein the at least one compression boss extends through the at least one hole;
   at least one switch provided on a substrate positioned at a rear side of the casing, wherein a position of the at least one switch corresponds to that of the at least one compression boss and at least one hole such that the at least one switch is manipulated by the at least one compression boss extending through the at least one hole; and
   a hooking device that fixes the cover plate to the button recess formed in the casing, the hooking device comprising:
      a first slit formed at each of two opposite ends of the button recess, and oriented perpendicular to a bottom edge of the button recess;
      a second slit that extends perpendicularly from a lower end of each first slit and parallel to the bottom edge of the button recess, wherein a width of the at least one second slit is greater than a width of the at least one first slit; and
      a slide hook formed at each of two opposite ends of the rear surface of the cover plate, and positioned corresponding to the first and second slits so as to engage the first and second slits.

17. The button apparatus of claim 16, wherein a front surface of the cover plate and an adjacent front surface of the casing form a substantially continuous surface when the cover plate is installed on the button recess.

18. The button apparatus of claim 16, wherein the hooking device further comprises:
- at least one first fitting hole extending through the button recess;
- a multi-function button hole extending through the button recess;
- at least one second fitting hole formed in a rear surface of the cover plate, corresponding to the at least one first fitting hole;
- a button hole extending through the cover plate, at a position corresponding to the multi-function button hole.

19. The button apparatus of claim 16, wherein the slide hook comprises:
- a first vertical wall that extends rearward from the rear surface of the cover plate, perpendicular to a bottom edge of the cover plate;
- a second vertical wall that extends rearward from the rear surface of the cover plate and perpendicular from an end of the first vertical wall such that the second vertical wall is parallel to the bottom edge of the cover plate and mating ends of the first and second vertical walls form a corner; and
- a top wall that extends between the first and second vertical walls.

20. The button apparatus of claim 19, wherein the hook holes and the slide hooks are symmetrically arranged on the button recess and the cover plate, respectively, such that the first and second slits are configured to slidably receive the first and second vertical walls respectively therethrough so as to position the horizontal wall in close contact with the rear surface of the button recess and hook the cover plate to the button recess.

* * * * *